United States Patent [19]
Miyamae

[11] Patent Number: 5,061,051
[45] Date of Patent: Oct. 29, 1991

[54] COMPACT ZOOM LENS

[75] Inventor: Hiroshi Miyamae, Tokyo, Japan

[73] Assignee: Konica Corporation, Tokyo, Japan

[21] Appl. No.: 485,470

[22] Filed: Feb. 27, 1990

[30] Foreign Application Priority Data

Mar. 7, 1989 [JP] Japan .................................. 1-52857

[51] Int. Cl.⁵ ............................................ G02B 15/00
[52] U.S. Cl. .................................... 359/683; 359/676
[58] Field of Search ............................... 350/423, 427

[56] References Cited

U.S. PATENT DOCUMENTS 4,770,510 9/1988 Mukaiya .............................. 350/423
4,824,226 3/1989 Tanaka .................................. 350/423

Primary Examiner—Paul M. Dzierzynski
Attorney, Agent, or Firm—Jordan B. Bierman

[57] ABSTRACT

A zoom lens comprising, in order from an object side, a first lens group having a positive refracting power, a second lens group having a negative refracting power and movable to vary the power, a third lens group having a negative refracting power and movable to compensate for deviation of an image position caused by varying the power, a fourth lens group having a positive refracting power for making a divergent luminous flux which exits from the third lens group substantially afocal, and a fifth lens group having a positive refraction power to an image, wherein the fourth lens group includes at least one positive single lens having a strong convex surface on the image side, the fifth lens group arranged behind a diaphragm between the fourth and the fifth lens groups and the fifth lens group comprises, in order from an object side, a front unit having a positive refracting power and a rear unit having a refracting power arranged in an air spaced relation with the front unit.

5 Claims, 17 Drawing Sheets

COMPACT ZOOM LENS

BACKGROUND OF THE INVENTION

1. Field of the Invention

The present invention relates to a compact zoom lens, and more particularly to a zoom lens whose variable power ratio is about 8 and F number is about 1.2 suitable for a video camera and a still video camera.

2. Description of the Prior Art

With recent rapid popularization of video cameras, particularly VTR integrated video cameras or still video cameras, these cameras have been tried to be compact. A zoom lens mounted on these cameras has also been desired to be compact and to have a high variable power ratio and a large aperture. Furthermore, a combination of a camera (image pickup) element such as a CCD and a color filter is used for formation of color signal. Therefore, luminous flux incident thereon is desirable to be incident on an image pickup surface substantially vertically to avoid mixing of colors caused by a color filter. An optical system used here is desired to be a telecentric structure in which an exit pupil is substantially infinitely far from an image pickup surface. It is also necessary to have enough backfocal length to install a lowpass filter for preventing spurious signal due to a spacial frequency beyond resolution of an image pickup element, an infrared cut filter to restrict a spectral sensitivity of the element within a visible area and the like.

When a diameter and a total length of a zoom lens are tried to be reduced maintaining a high variable power ratio and a large aperture and fulfulling various conditions as described above, it becomes difficult to correct various aberrations such as distortion, comatic aberration, chromatic aberration and the like, failing to satisfy such an imaging performance as desired.

Zoom lenses having a high variable power ratio which are bright in which a variable power ratio is 8 and F number is about 1.2 for video cameras and still video cameras have been heretofore known from (1) Japanese Patent Application Laid-Open Publication No. 222,807/1984
(2) Japanese Patent Application Laid-Open Publication No. 186,818/1985
(3) Japanese Patent Application Laid-Open Publication No. 93,423/1986
(4) Japanese Patent Application Laid-Open Publication No. 54,213/1987 and the like.

Zoom lenses having a high variable power ratio whose variable power ratio is about 12 have been known from Japanese Patent Application Laid-Open Publication No. 71,015/1984 and the like.

These zoom lenses each comprise, from an object side, a first lens group having a positive refracting power, a second lens group having a negative refracting power and being movable to vary the power, a third lens group having a negative refracting power and being movable to compensate for deviation of an image position caused by varying the power, a fourth lens group having a positive refracting power and making a divergent luminous flux which exits from the third lens group substantially afocal, and a fifth lens group having a positive refracting power for forming an image.

The aforesaid lens is a relatively compact system without complicating a construction of a lens-barrel and has been heretofore widely used. However, a length (hereinafter referred to as total length) from a surface of a lens closest to the object to an image pickup surface is as large as 14 to 16 times of a focal length at the wide angle end, and with this, a diameter of a front lens becomes large, which cannot be said sufficiently compact.

Moreover, the lens having high variable power ratio such as about 12 is slow or dark such as a F number of 1.6 at the wide angle end, which cannot be said to have a sufficient brightness for a video camera or a video still camera.

SUMMARY OF THE INVENTION

It is an object of the present invention to provide a very compact zoom lens which is suitable for an ordinary, video camera or a still video camera and in which a total length is 11 to 12 times of a focal length at the wide angle end in case that the variable power ratio is about $8\times$ and is short such as 15 times of said focal length in case that the power ratio is $12\times$ while having a large aperture and a high variable power ratio such as a variable power ratio of about $8\times$ to $12\times$ and F number of 1.2 to 1.4, and a diameter of a front lens is about 4 to 5 times of a focal length at the wide angle end.

The fundamental structure of a zoom lens according to the present invention comprises the above-described five groups, that is, in order from an object side, a first lens group having positive refracting power, a second lens group having a negative refracting power and being movable to vary the power, a third lens group having a negative refracting power and being movable to compensate for deviation of an image position caused by varying the power, a fourth lens group having a positive refracting power and making a divergent luminous flux which exits from the third lens group substantially afocal, and a fifth lens having a positive refracting power for forming an image, characterized in that said fourth lens group comprises at least one positive single lens having a strong convex surface on the image side; said fifth lens group arranged behind a diaphragm comprises, in order from an object side, a front unit having a positive refracting power and a rear unit having a positive refracting power arranged in an air-space relation with said front unit; said front unit comprises, in order from an object side, a biconvex lens, a nigative single lens having a surface having a strong curvature directed toward the object and a positive meniscus single lens having convex surface directed toward the object; and said rear unit comprises, in order from an object side, a positive single lens, a negative meniscus single lens having a concave surface directed toward the image side, and a positive single lens having a strong convex surface directed toward the object.

More specifically, the fourth lens group of the zoom lens according to the present invention is fulfilled with the following condition.

$$1.0 < \frac{|R_{44}|}{f_4 (N_{42} - 1)} < 2.0 \quad (R_{44} < 0) \tag{1}$$

$f_4$: Synthesized focal length of the fourth lens group
$N_{42}$: Refractive indes of a positive lens closest to the image of the fourth lens group
$R_{44}$: Radius of curvature of a surface on the image side of a positive lens closest to the image side in the fourth lens group The fifth lens group is fulfilled with the following conditions.

$$2.5 < \frac{f_5}{f_w} < 4.5 \quad (2)$$

$$1.5 < \frac{f_{51}}{f_5} < 2.5 \quad (3)$$

$$AN_{52p} < 1.6 \quad (4)$$

$$0.25 < \frac{R_5}{f_5} < 0.35 \quad (5)$$

where
- $f_w$: Focal length at the wide angle end of the entire system
- $f_5$: Synthesized focal length of the fifth lens group
- $f_{51}$: Synthesized focal length of the front unit in the fifth lens group
- $AN_{52p}$: Average value of the refractive indices of the positive lenses in the rear unit of the fifth lens group
- $R_5$: Radius of curvature of the surface on the image side of a negative meniscus single lens in the rear unit of the fifth lens group In order to realize a compact zoom lens with less number of lenses, it is desirable to have the structure as described hereinbelow.

The first lens group comprises three lenses including, in order from an object side, a doublet comprising a negative meniscus single lens having a concave surface directed toward the image and a biconves lens having a strong convex surface directed toward the object and a positive meniscus single lens having a convex surface directed toward the object; the second lens group comprises three lenses including, in order from an object, a negative meniscus single lens having a concave surface directed toward the image, and a doublet comprising a biconcave lens and a positive single lens having a strong convex surface directed toward the object; and the third lens group comprises a negative lens having a strong concave surface directed toward the object, said negative lens comprising a negative single lens or a cemented doublet compromising a biconcave single lens and a positive single lens having a strong convex surface directed toward the object, the following conditions being fulfilled:

$$0.15 < \frac{f_2 F_w}{f_w Z} < 0.25 \quad (6)$$

$$2.0 < \frac{f_3}{f_2} < 4.0 \quad (7)$$

$$1.7 < AN_{2N} \quad (8)$$

$$25 < AV_{2N} - V_{2p} \quad (9)$$

- $f_i$: Focal length of the ith lens group
- $AN_{2N}$: Average value of the refractive indices of the negative lenses in the second lens group
- $AV_{2N}$: Average value of Abbe's number of the negative lenses in the second lens group
- $V_{2p}$: Abbe's number of the positive lens in the second lens group
- $Z$: Variable power ratio
- $F_w$: Open F number at the wide end of the entire zoom lens system In the zoom lens of this kind, generally, a height of a principal ray which passes through a front lens is highest between a wide angle end and an intermediate focal length, in connection with the field angle and the position of entrance pupil, and thereby the size of the front lens is determined.

In the structure of the zoom lens according to the present invention, particularly the fourth lens group comprises at least one positive single lens having a strong convex surface on the image side. The height from an optical axis of the ray which passes in the vicunity of a center of a diaphragm is as less as possible before the third lens group. Particularly, an entrance pupil position is moved toward the object as close as possible between a wide angle end and an intermediate focal length thereby achieving the reduction in diameter of the front lens.

The fifth lens group comprises a front unit and a rear unit each having a positive refracting power, an air space being sandwiched therebetween to correct chromatic aberrations on axis and magnification.

The front unit has a biconvex lens having a relatively strong refracting power disposed on the closest side of the object to reduce the telephoto ratio of the fifth lens group. The next negative lens has a strong concave surface on the object side to correct the spherical aberration and the comatic aberration produced in the biconvex lens. In case where a negative lens is arranged behind a positive lens with a strong refracting power, the Petzval's sum is negatively deviated as the relative distance therebetween becomes larger. However, in a case as in the zoom lens of the present invention in which th Petzval's sum is already negative in the lens group for varying the power, it is better to place them as close as possible. A positive meniscus single lens having a convex surface directed toward the object is disposed on the outmost image side of the front unit to impart a strong refracting power to the front unit without greatly producing the comatic aberration and the astigmatism to shorten the total length of the fifth lens group. A negative meniscus lens having a strong concave surface directed toward the image side is disposed in the rear unit to principally correct the negative distortion produced by the second lens group. A positive lens having a strong refracting power is disposed at the rear of the negative lens to provide an optical system which is telecentric on the image side.

Among the specific constitutional requirements of the present invention, the condition (1) is concerned with the redius of curvature of the surface closest to the image side in the fourth lens group. When the value exceeds the upper limit, the height of the principal ray which passes through the front lens between the wide angle end and the intermediate focal length is too high, and the diameter of the front lens increases. Conversely, when the value exceeds the lower limit, the refracting power at the refracting surface is too strong, and it is difficult for the fifth lens group having the structure according to the present invention to correct the under spherical aberration.

The condition (2) is concerned with the refracting power of the fifth lens group. When the value exceeds the upper limit, the total length of the fifth lens group becomes so extended that the entire system cannot be constructed to be compact. When the value exceeds the lower limit, it is advantageous to shorten the total length of the fifth lens group whilst the field angle of said lens group increases, which leads to increase the diameter of the front lens.

The condition (3) is concerned with the refracting power of the front unit of the fifth lens group. When the value exceeds the lower limit, it is difficult to correct the spherical aberration of under and the convergent comatic aberration produced in the front unit, and in addition, back focal length cannot be satisfied. When the value exceeds the upper limit, it is advantageous to correct the aberration caused by the aperture whilst the total length of the fifth lens group increases if an attempt is made to provide a telecentric property.

The condition (4) is concerned with the average refractive indices of the positive lenses in the rear unit of the fifth lens group. When this condition is not fulfilled, the Petzval's sum of the entire system is negatively deviated, and the sagital image surface becomes over.

The condition (5) is concerned with the concave surface of the negative meniscus single lens in the rear unit. When the value exceeds the upper limit, the sistortion becomes under. When the value exceeds the lower limit, the incident hight of the ray into the next positive lens becomes high, and the coma flare of high order occurs.

The condition (6) is concerned with the focal length of the second lens group. The focal length of the second lens group becomes short when F number increases of the zoom ratio decreases. When the value exceeds the upper limit, the absolute value of the focal length of the second lens group increases and the amount of displacement necessary to vary the power increases, and the total lens length from the first lens group to the fourth lens group increases, failing to achieve the object of the present invention which is to obtain a compact zoom lens. Conversely, when the value exceeds the lower limit, it is advantageous to shorten the total lens length from the first lens group to the fourth lens group whilst an increase of negative distortion on the wide angle side, an increase of variation in comatic aberration caused by varying the power and an increase of Petzval's sum in a negative direction result, and correction becomes difficult depending on the structure of the fifth lens group.

The condition (7) is concerned with the focal length of the third lens group. When the value exceeds the upper limit, the displacement of the third lens group to compensate the deviation of an image surface increases. It is necessary to increase the spacing between the second lens group and the third lens group, thus increasing the total lens length from the first lens group to the fourth lens group. When the value exceeds the lower limit, the variation of the comatic aberration caused by varying the power increases and the Petzval's sum negatively increases. Further, a degree of divergence of the divergent luminous flux which exits from the third lens group is intensified. When a substantially afocal luminous flux is provided at the fourth lens group, the action of the refracting surface of the fourth lens group is excessively intensified so that the convergent spherical aberration and comatic aberration which cannot be corrected by the said structure of the fifth lens group increase. Moreover, the error in position and in inclination during the manufacture of the third lens group greatly affects on an image forming surface, which causes a higher cost in the manufacture.

The condition (8) is concerned with the average value of the refracting indices of the negative lenses in the second lens group. When the value is smaller than the lower limit, the negative distortion on the wide angle side increases, the Petzval's sum negatively increases and the variation of the comatic aberration caused by varying the power increases.

The condition (9) is concerned with the Abbe's number of the second lens group. In the zoom lens as in the present invention, the variation of chromatic aberration caused by varying the power in each lens group is minimized to correct the chromatic aberration of system. When the value exceeds the lower limit of this condition, it is necessary to intensify the refracting power of the negative lens and the positive lens of the second lens group in order to minimize the variation of the chromatic aberration of the second lens group caused by varying the power. However, when the refracting power of the negative lens and the positive lens of the second lens group is intensified, it is difficult to minimize the variation of the spherical aberration, comatic aberration and astigmatism caused by varying the power.

DESCRIPTION OF THE EMBODIMENTS

Figure 1:
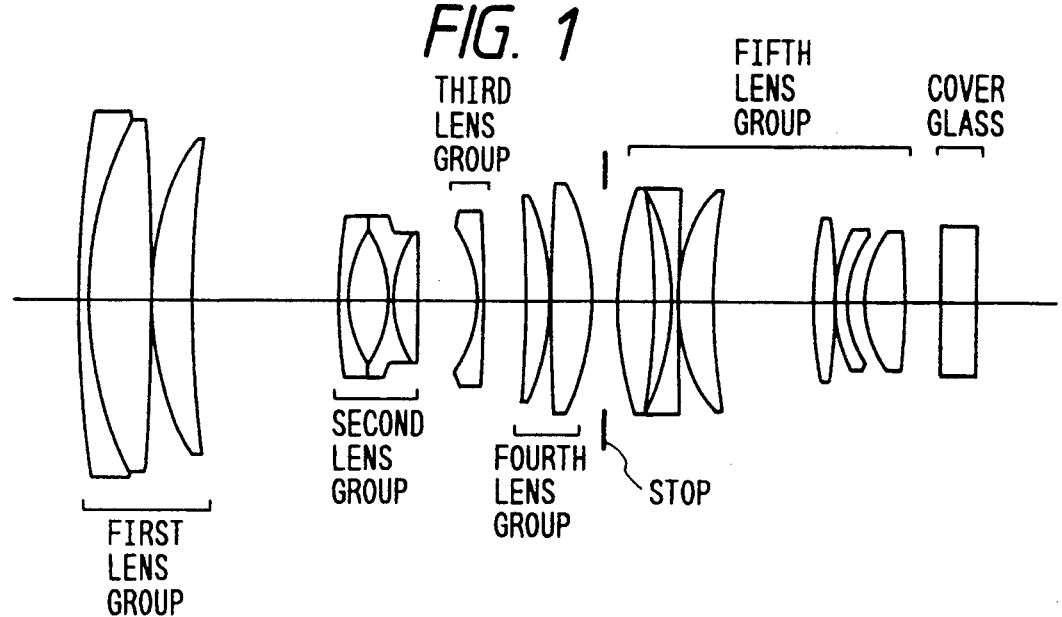
FIGS. 1 to 9 are sectional views of Examples 1 to 9, respectively, according to the present invention.
Figure 2:
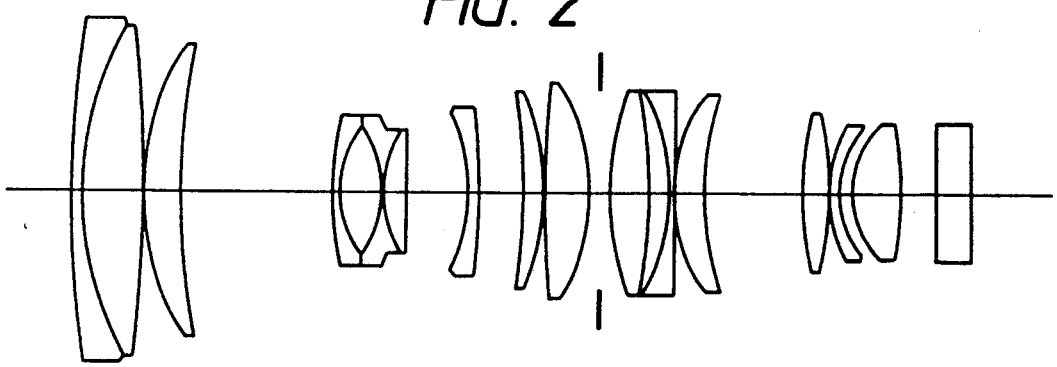
Figure 3:
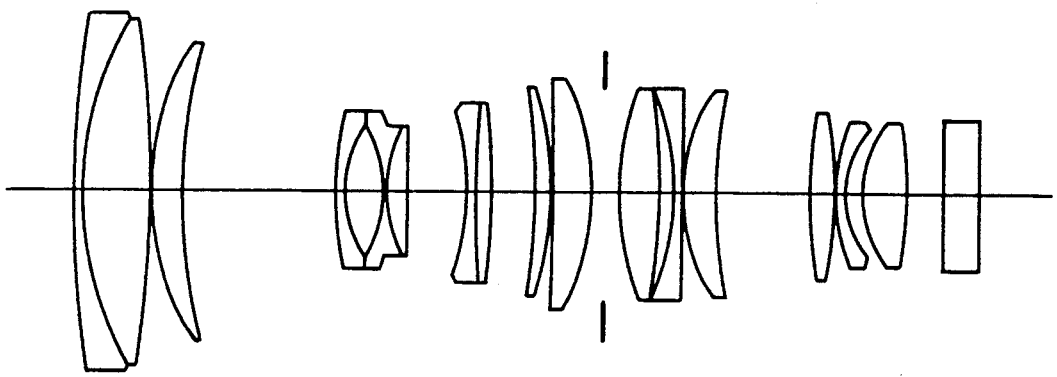
Figure 4:
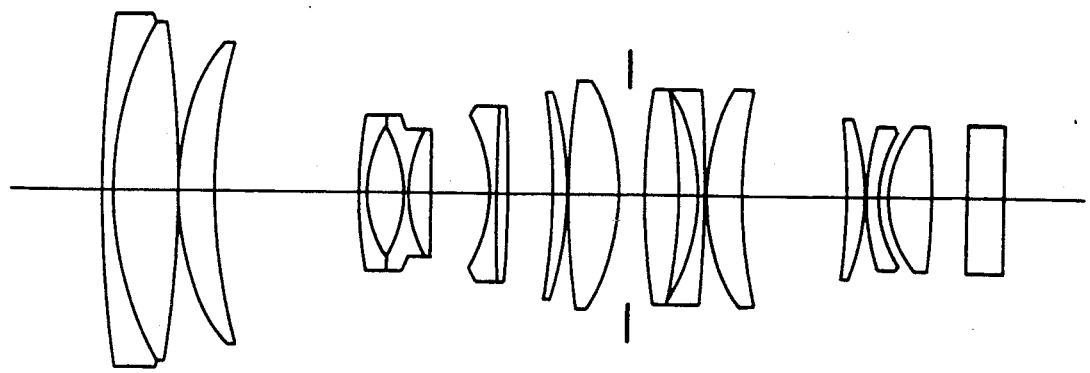
Figure 5:
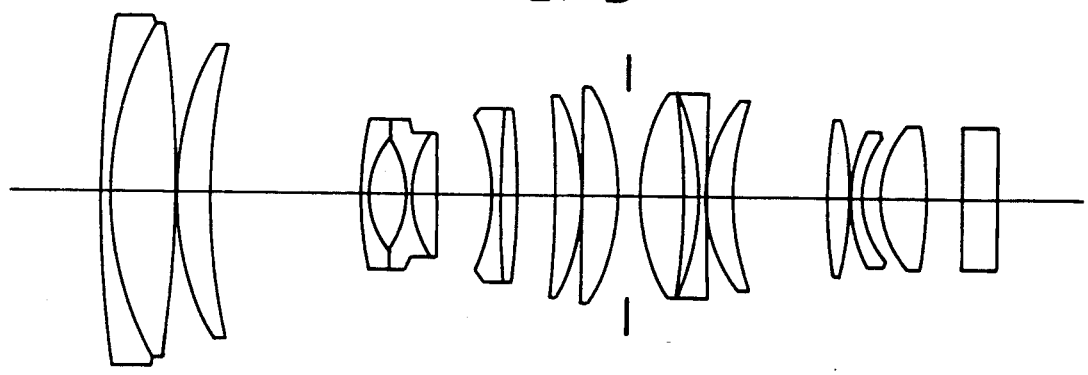
Figure 6:
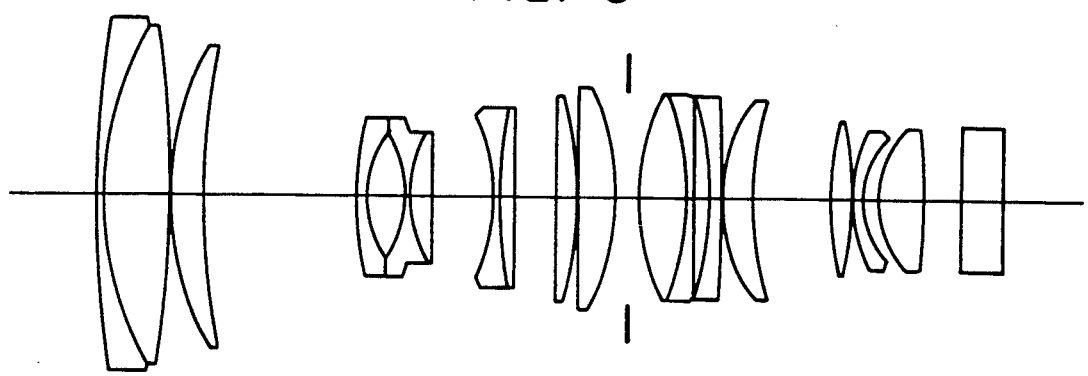
Figure 7:
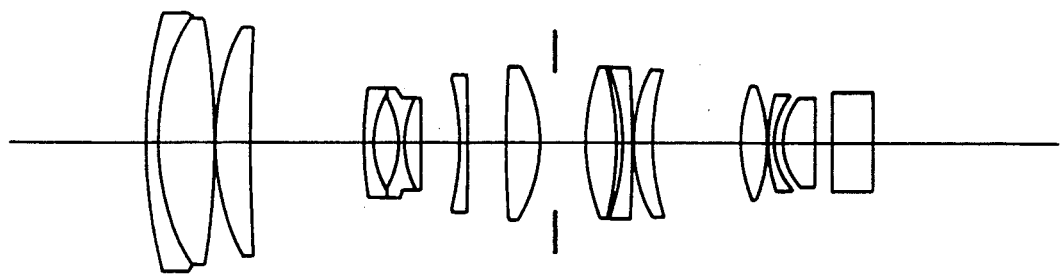
Figure 8:
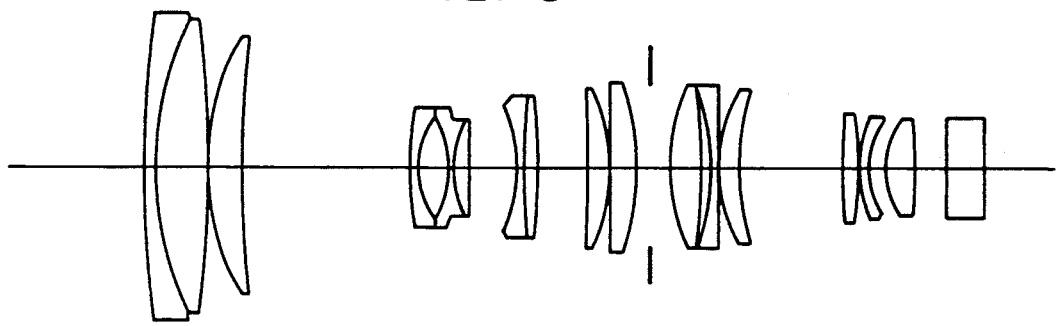
Figure 9:
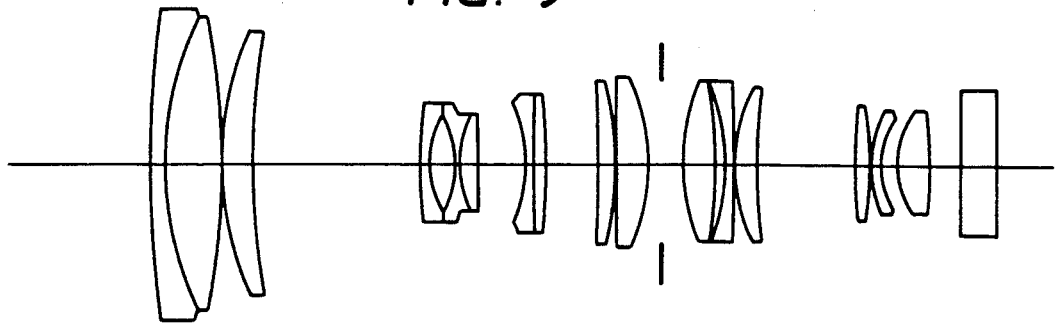
Figure 10A:
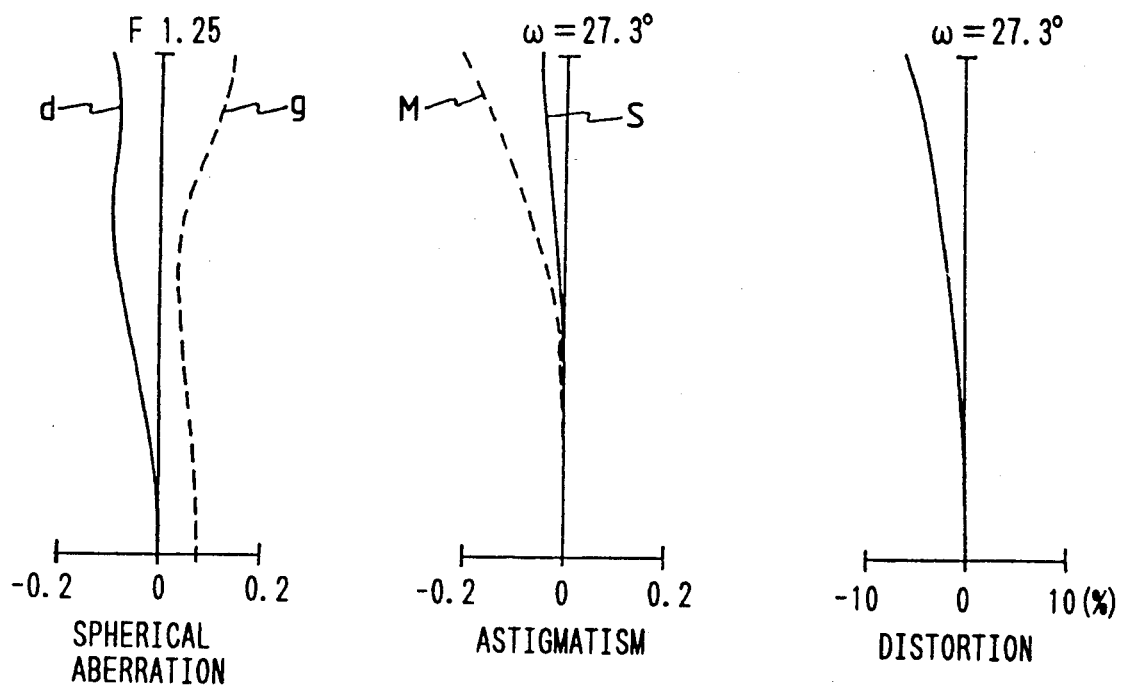
FIGS. 10 to 18 are aberration curves of Examples 1 to 9, respectively. (a) represents the wide angle end, (b) the intermediate portion, and (c) the telephoto-end.
Figure 10B:
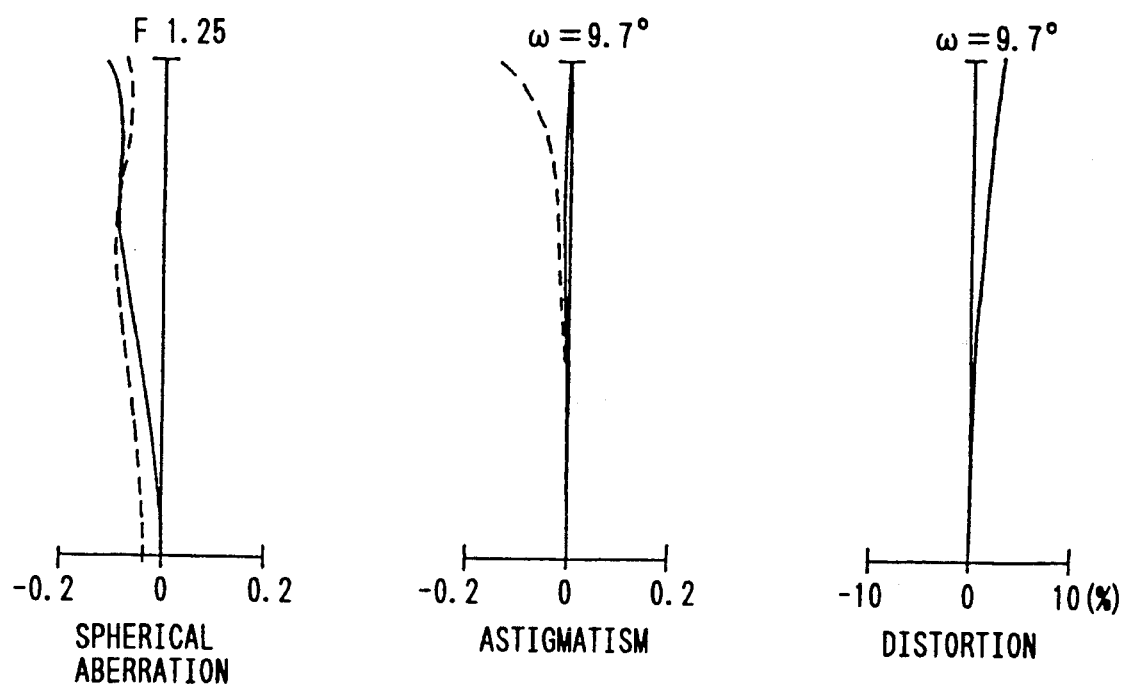
Figure 10C:
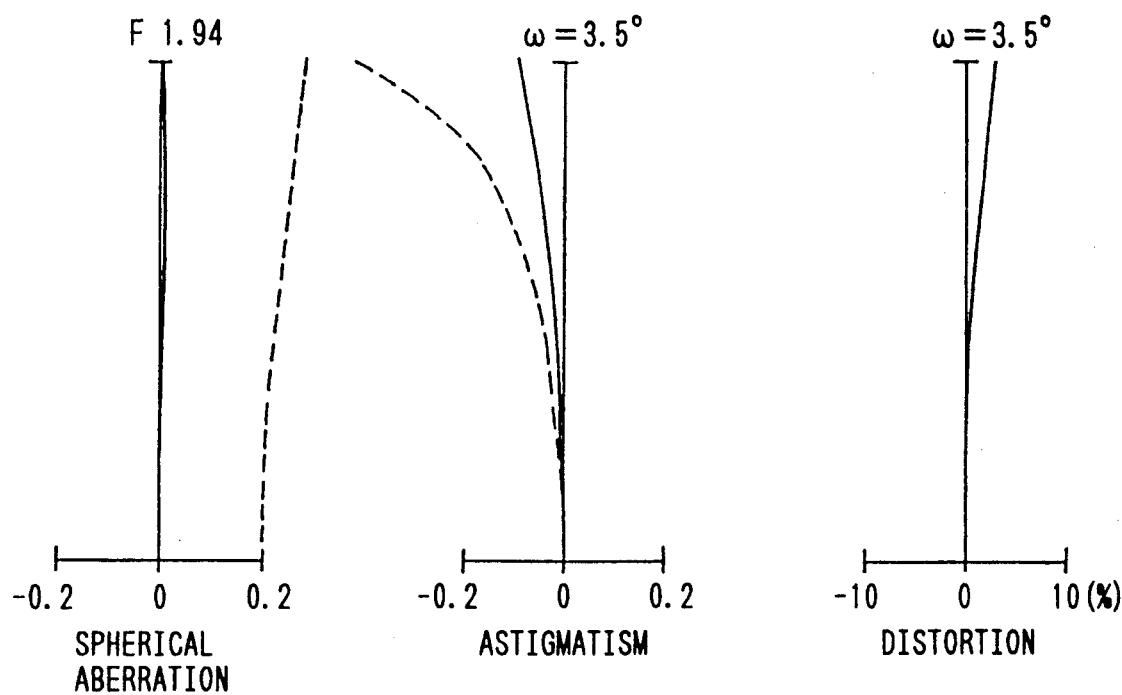
Figure 11A:
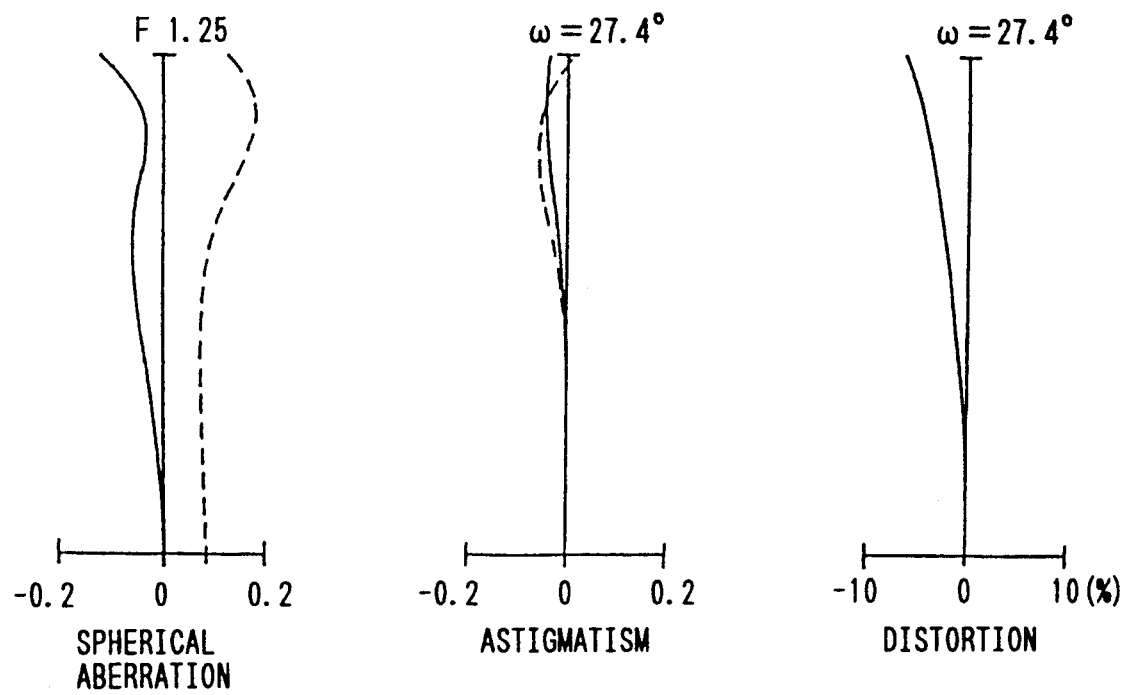
Figure 11B:
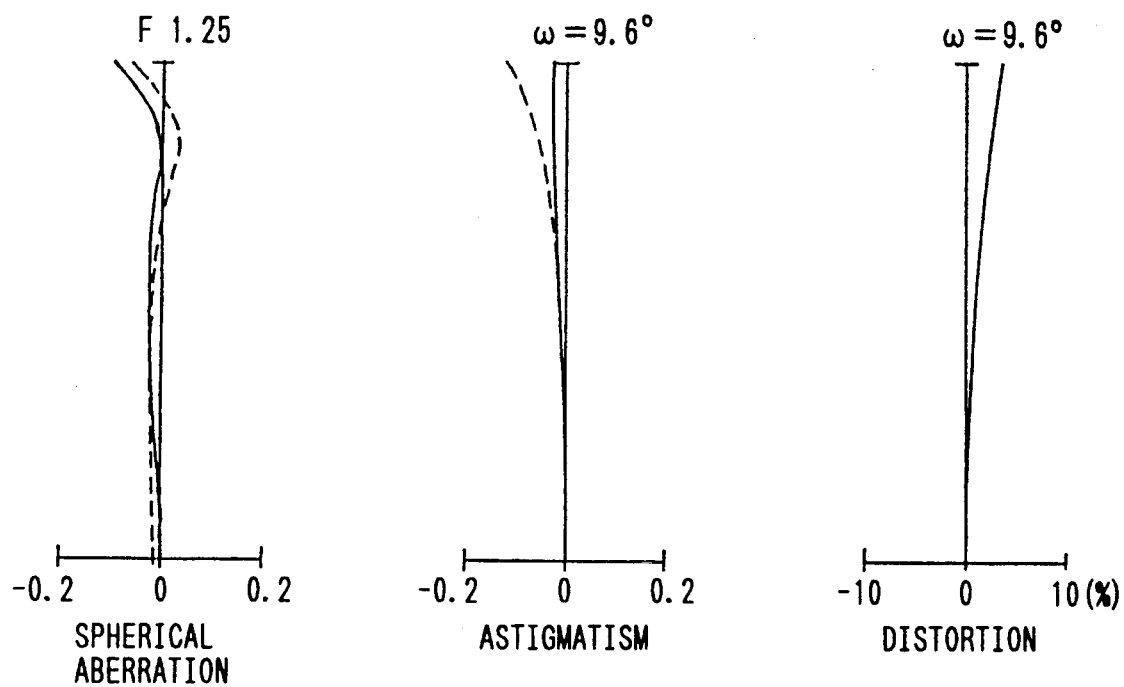
Figure 11C:
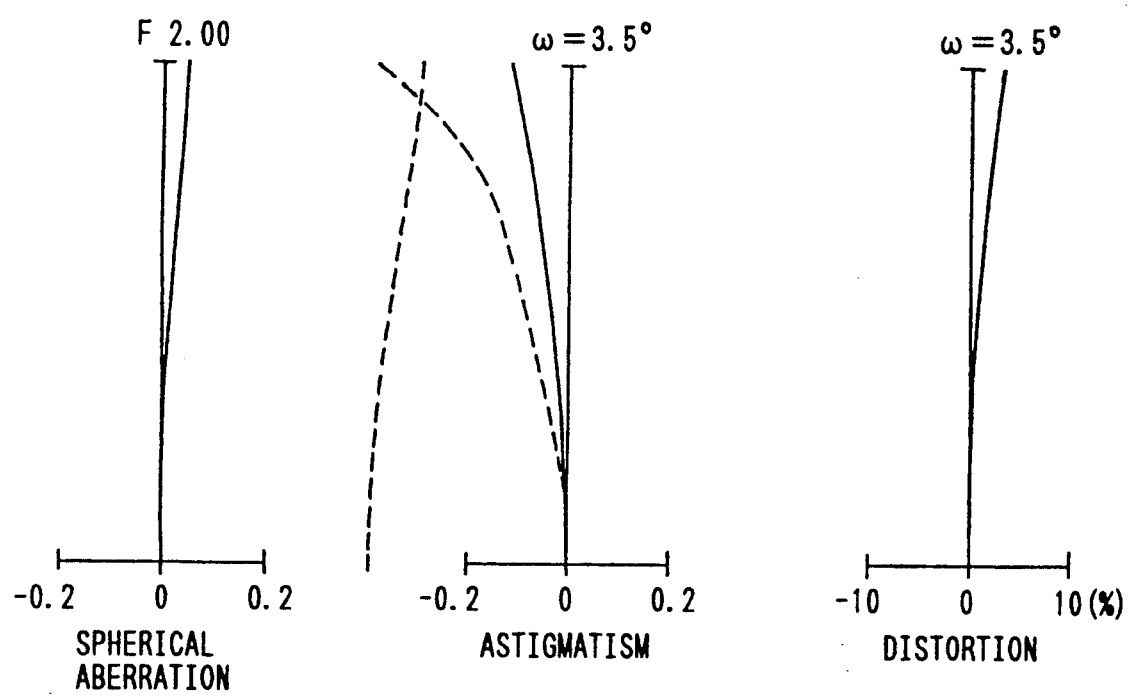
Figure 12A:
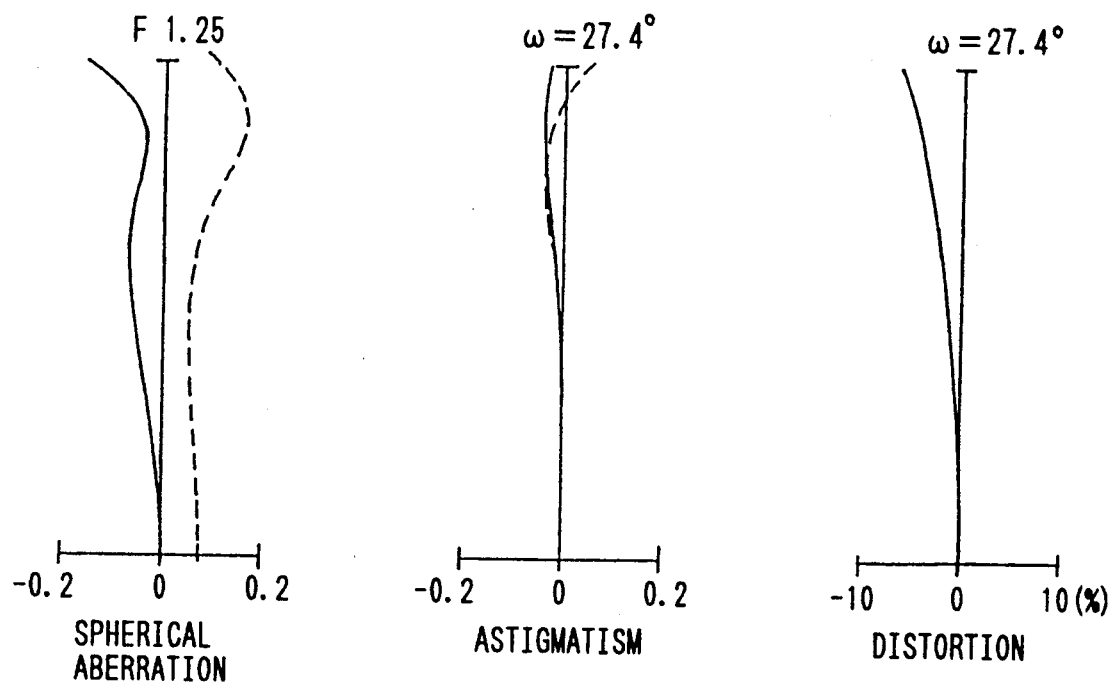
Figure 12B:
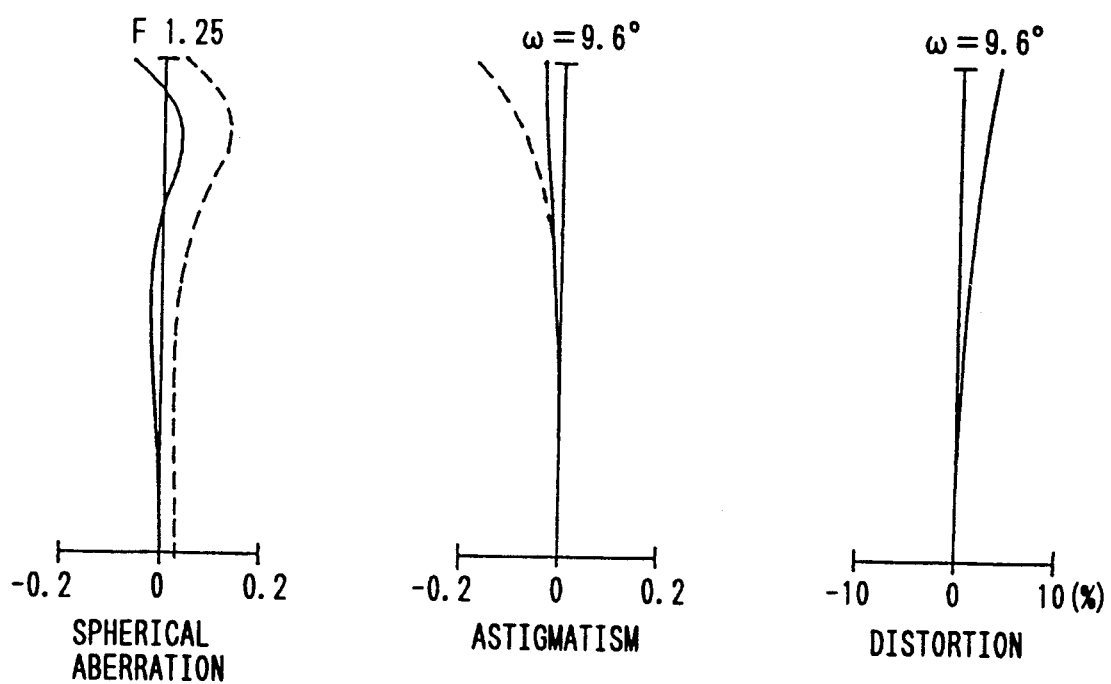
Figure 12C:
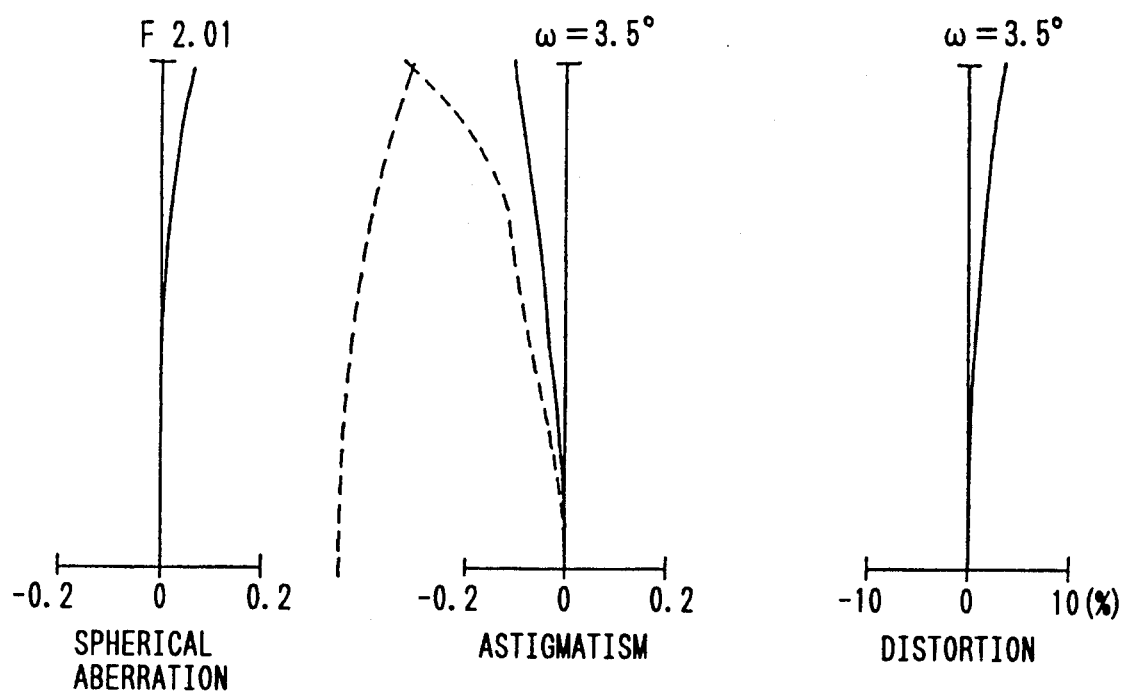
Figure 13A:
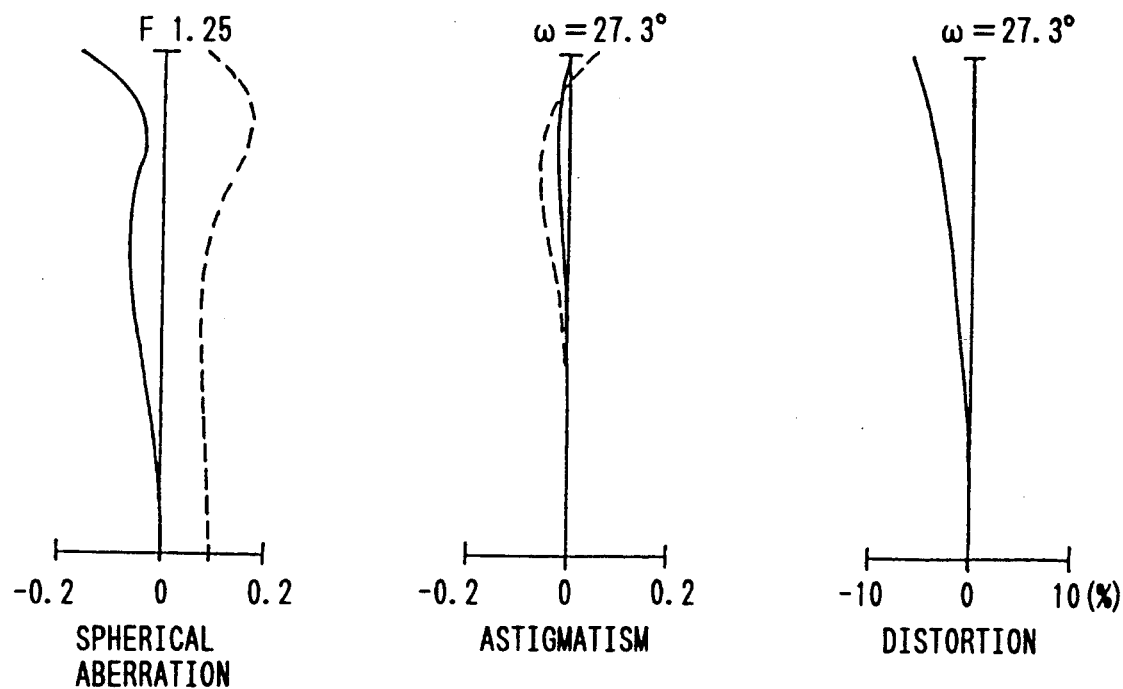
Figure 13B:
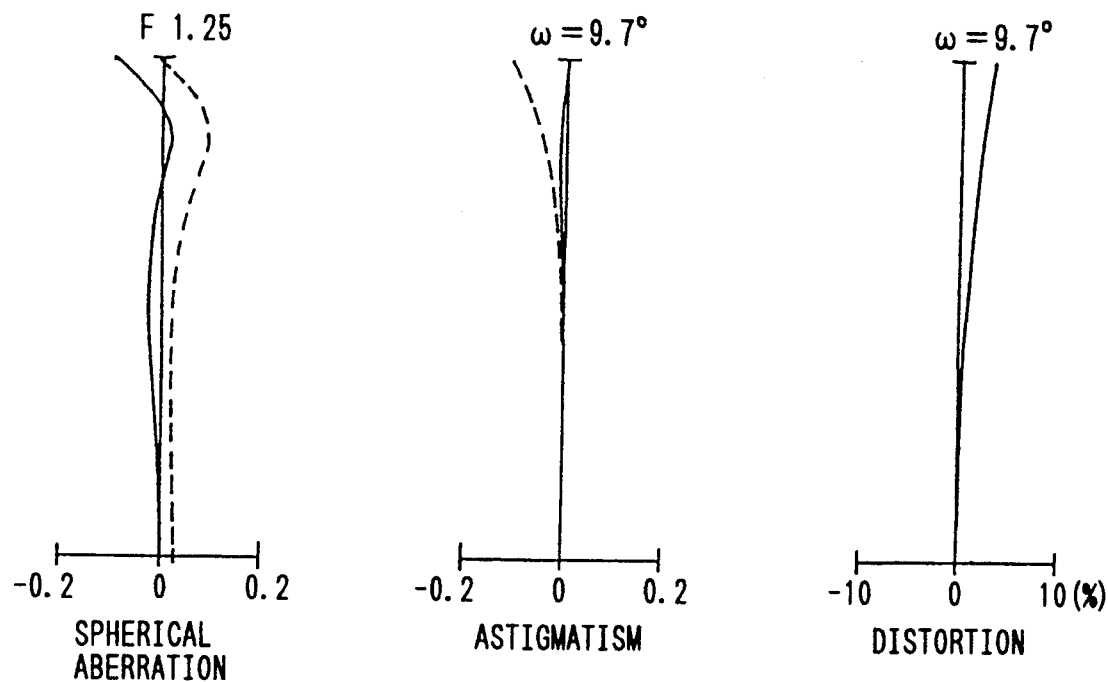
Figure 13C:
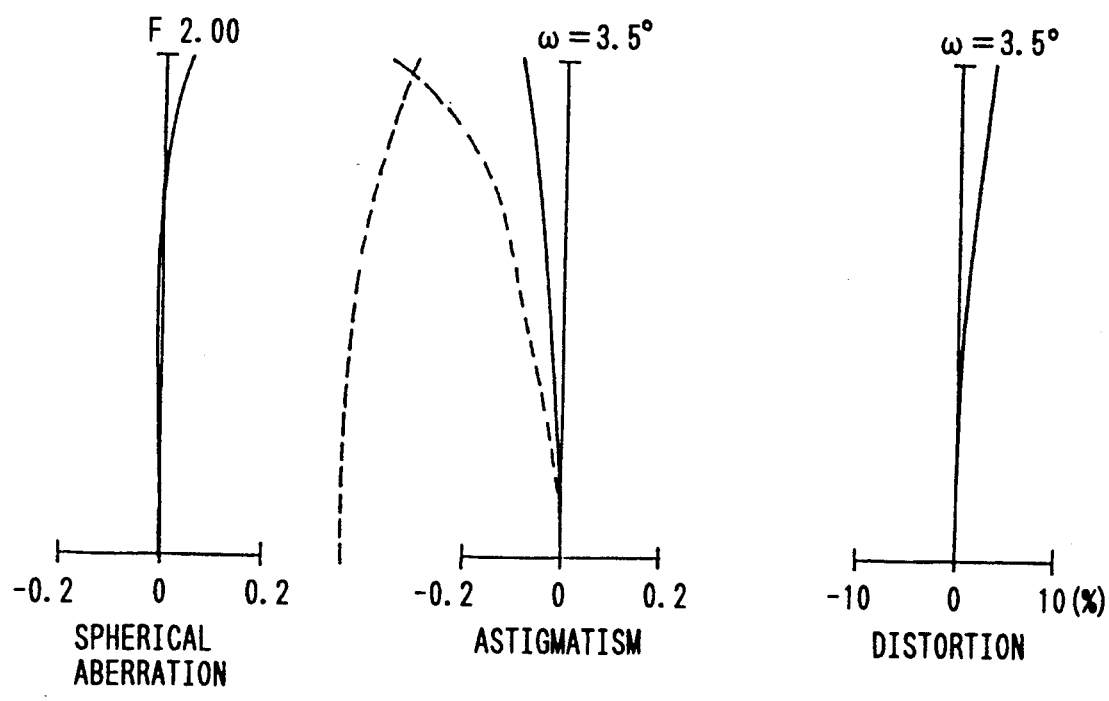
Figure 14A:
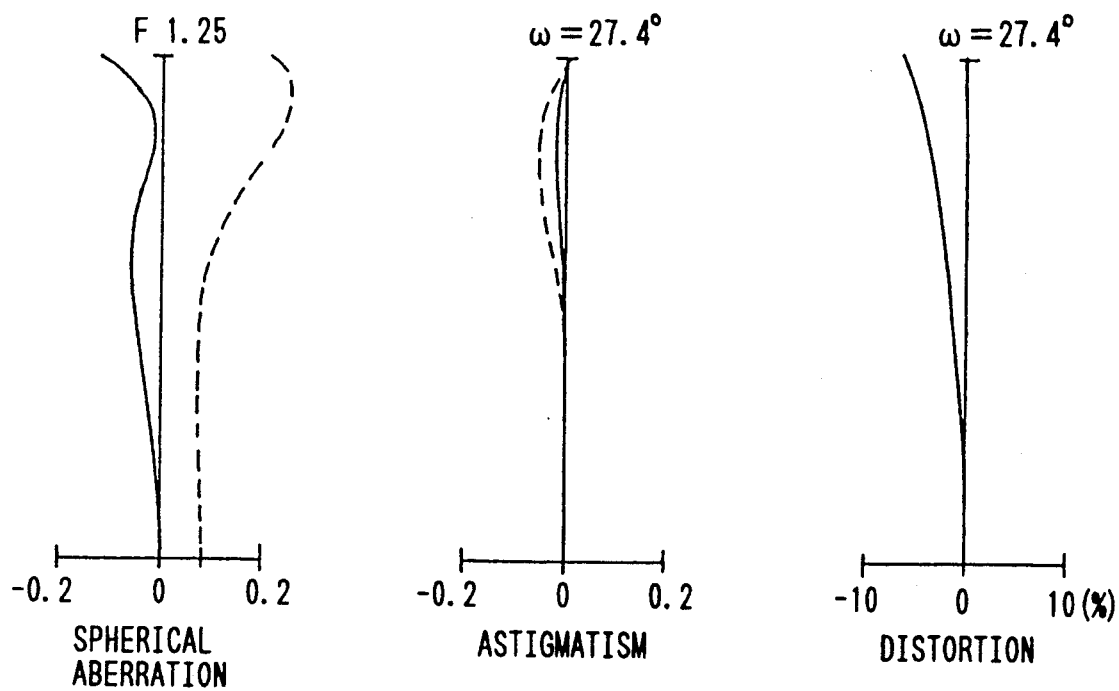
Figure 14B:
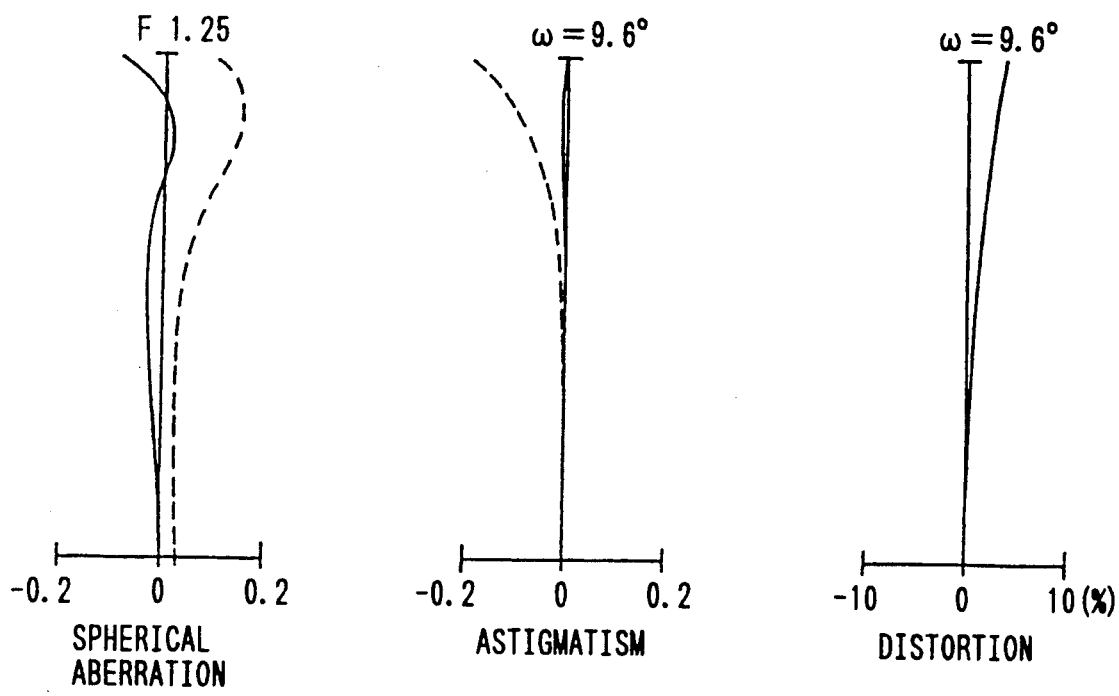
Figure 14C:
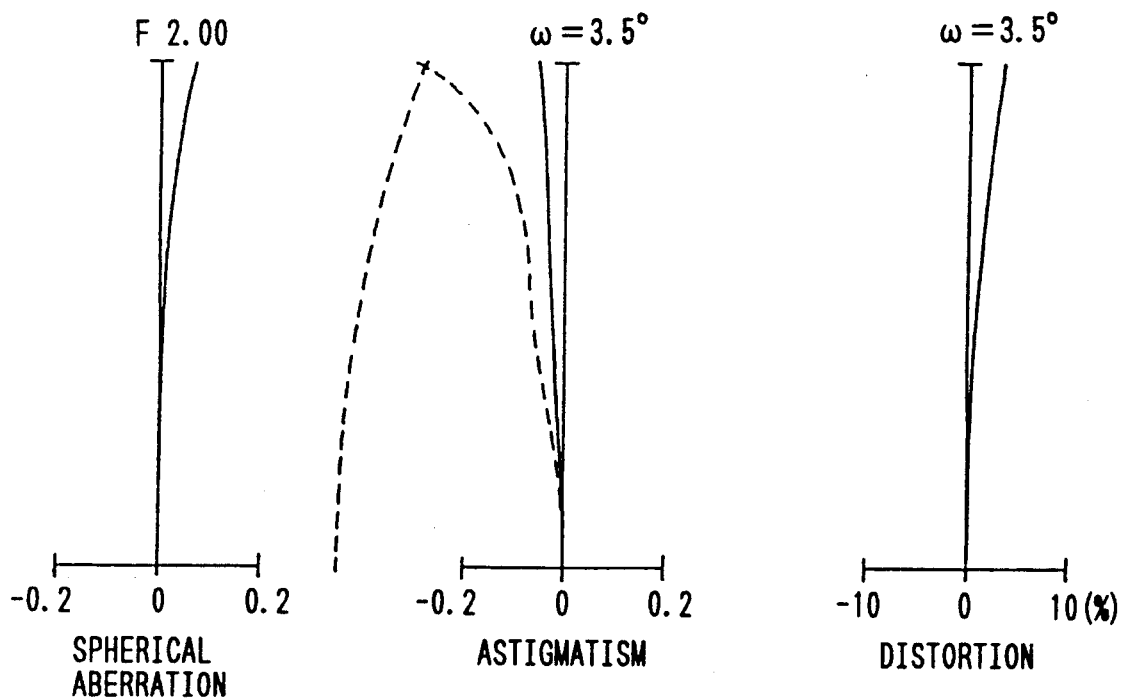
Figure 15A:
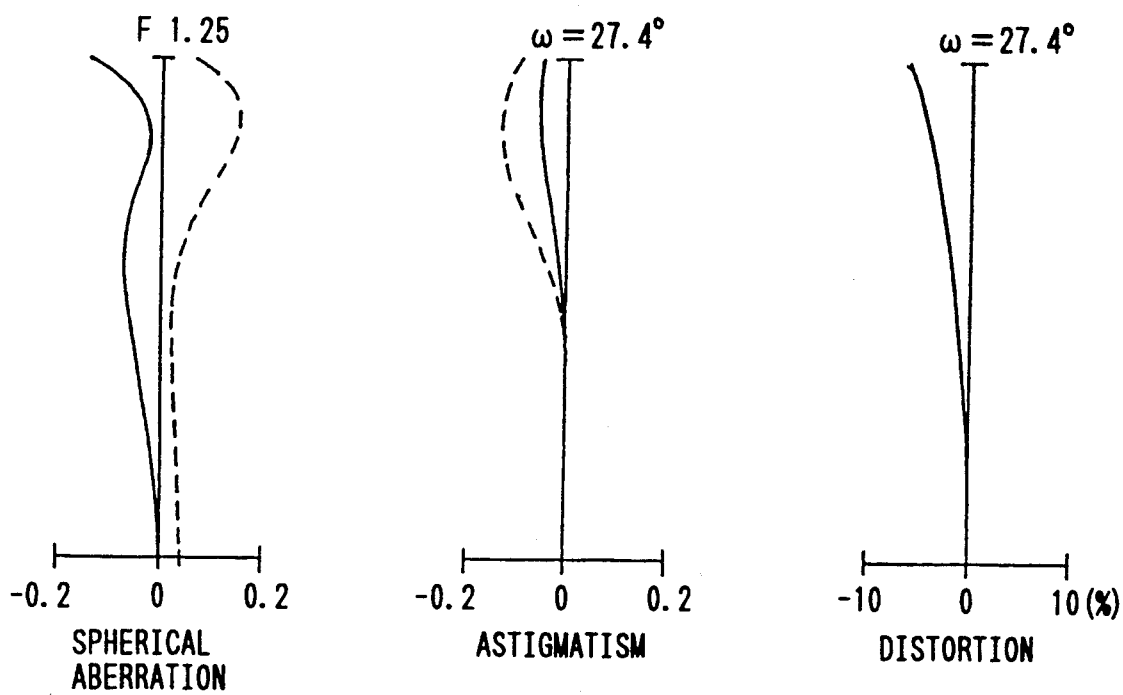
Figure 15B:
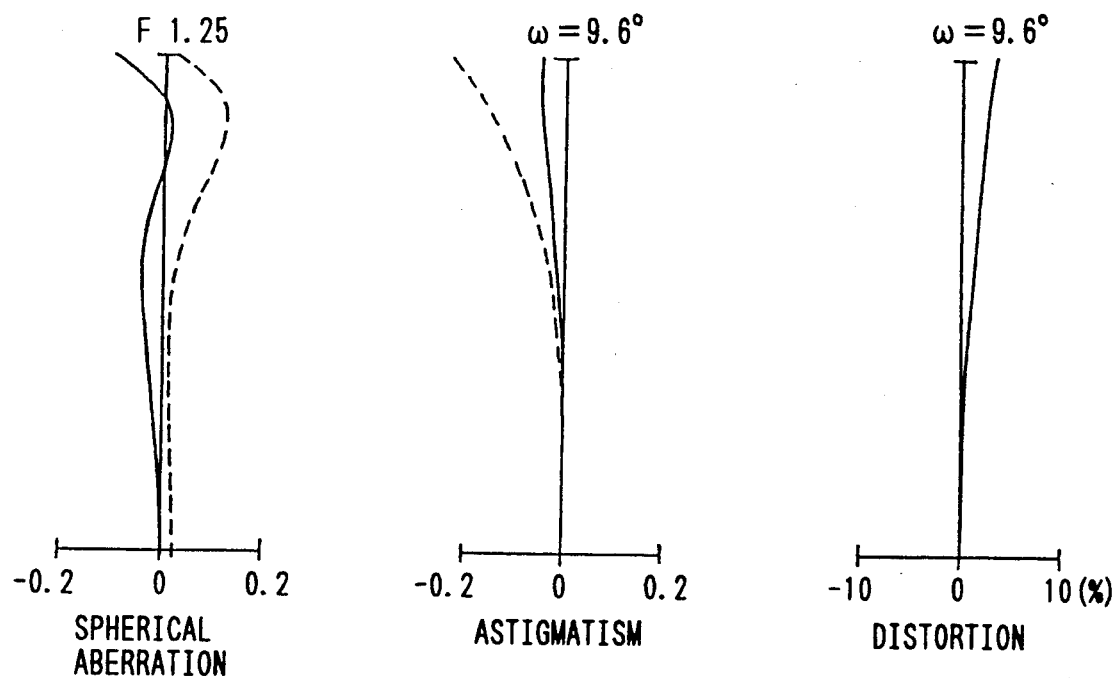
Figure 15C:
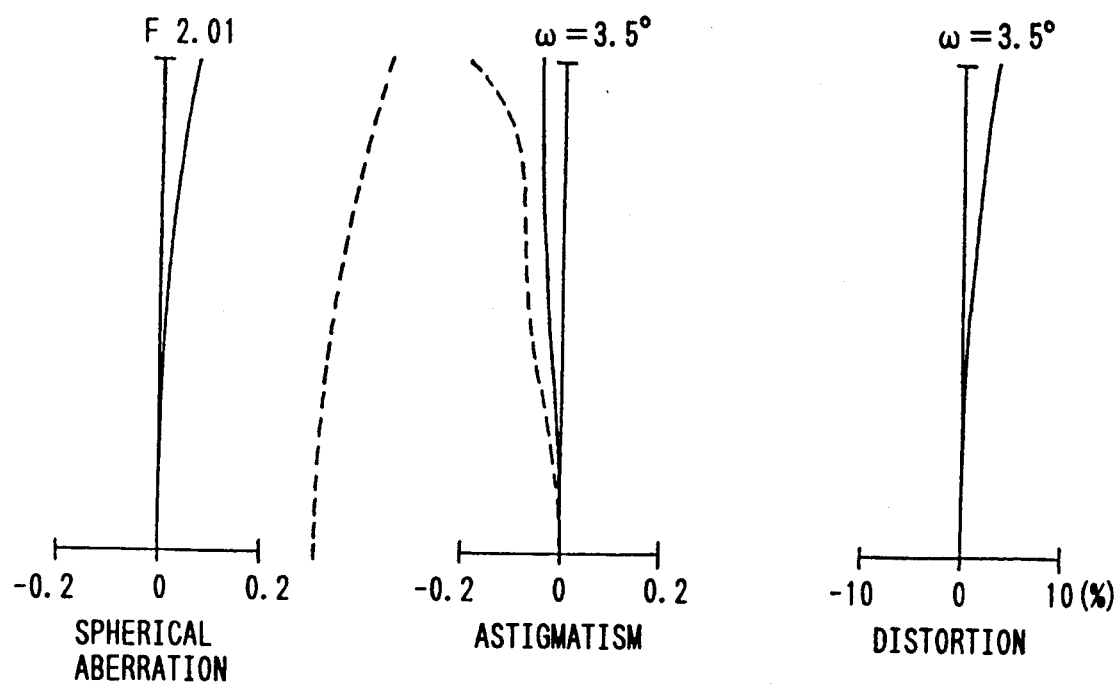
Figure 16A:
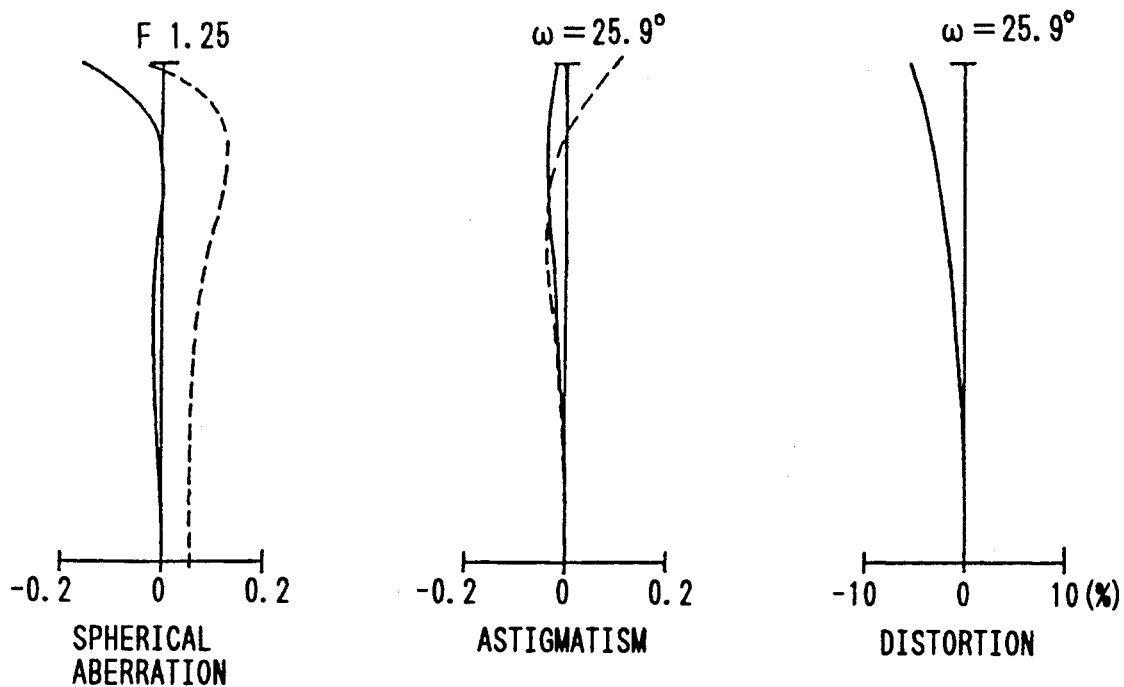
Figure 16B:
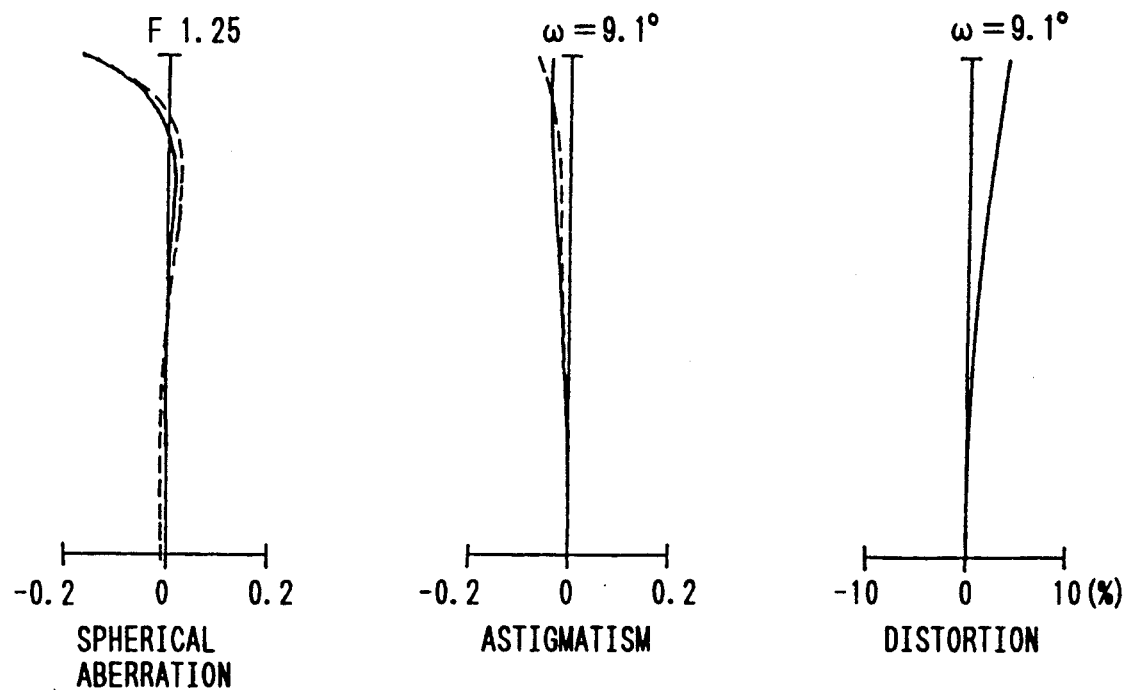
Figure 16C:
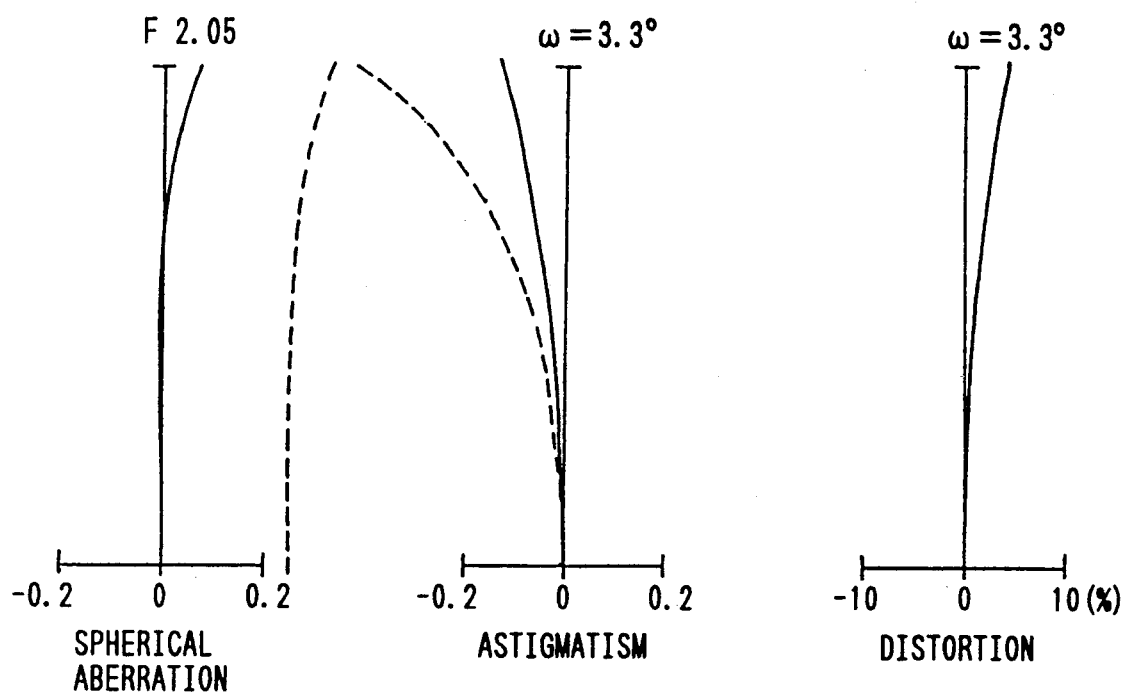
Figure 17A:
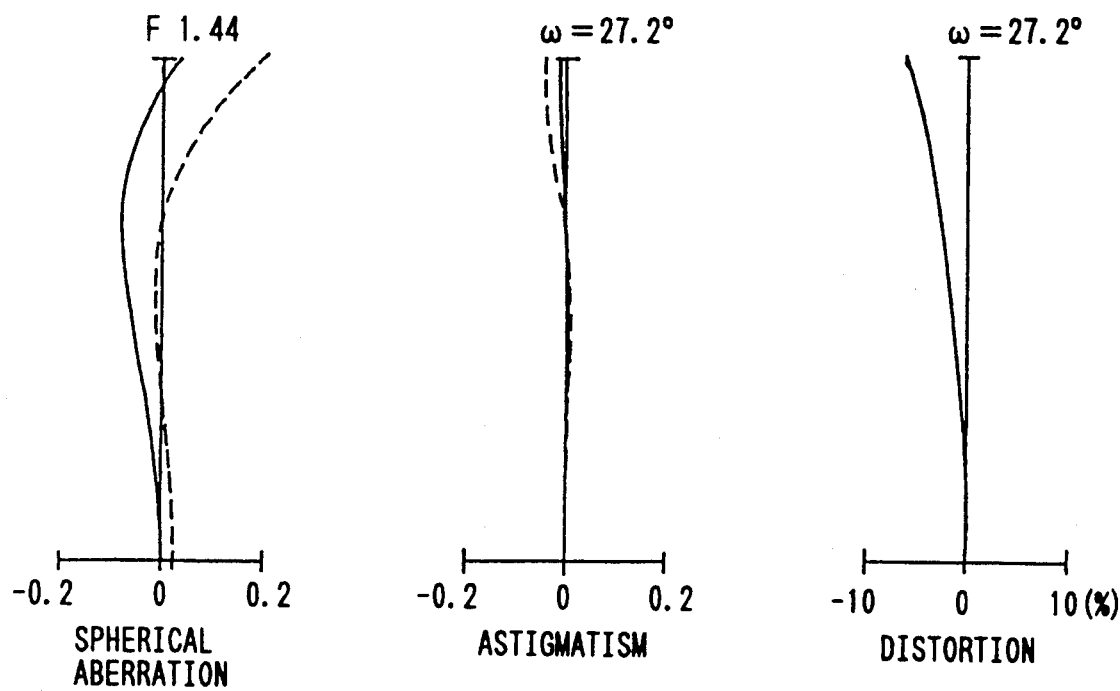
Figure 17B:
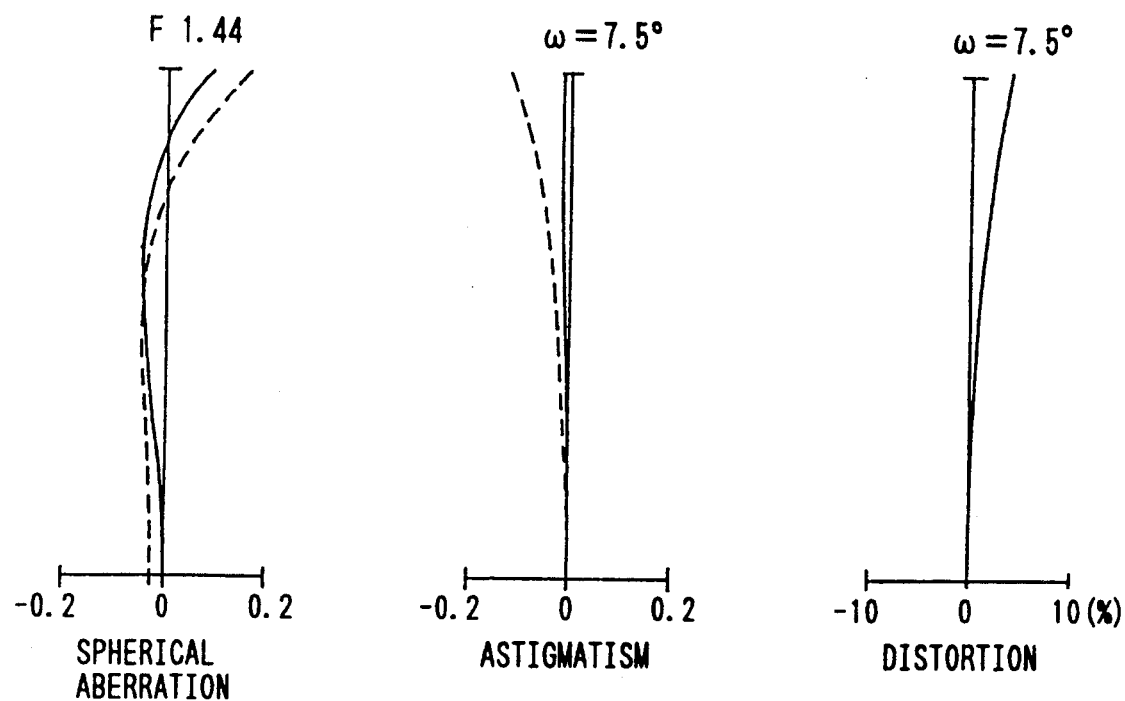
Figure 17C:
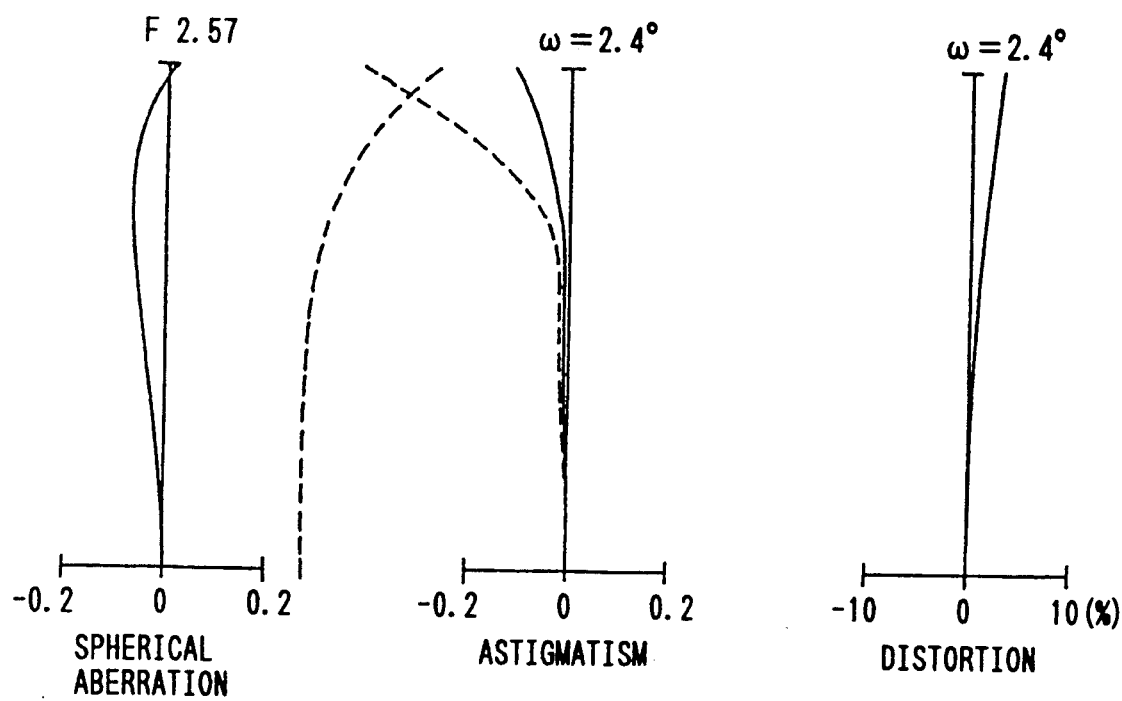
Figure 18A:
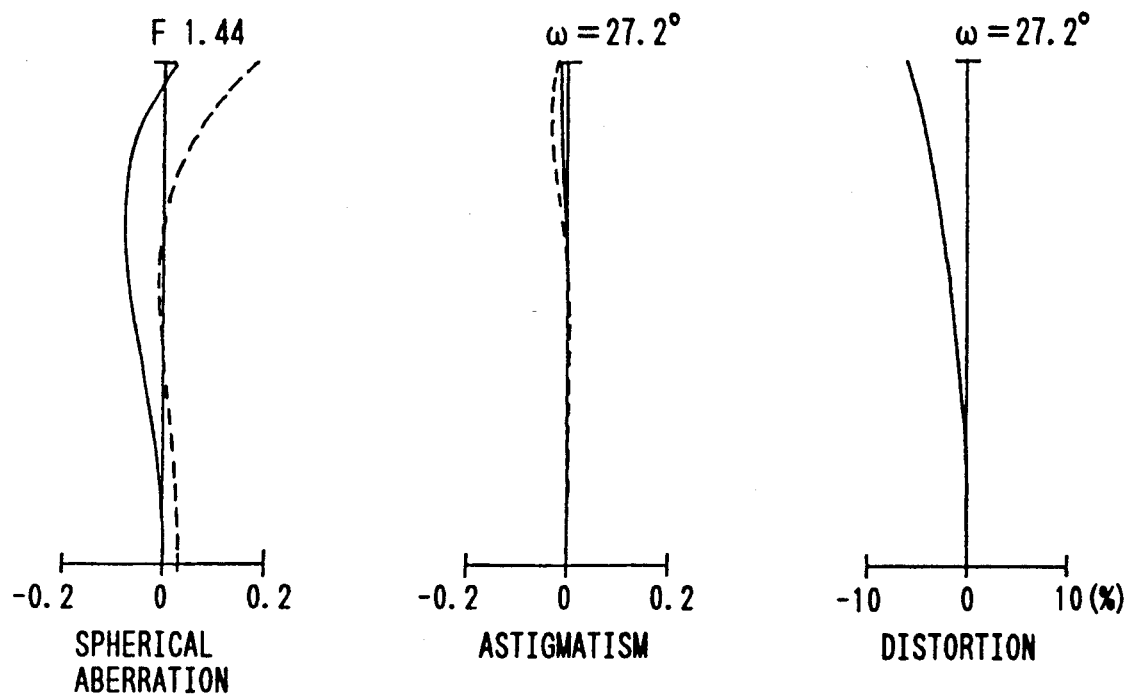
Figure 18B:
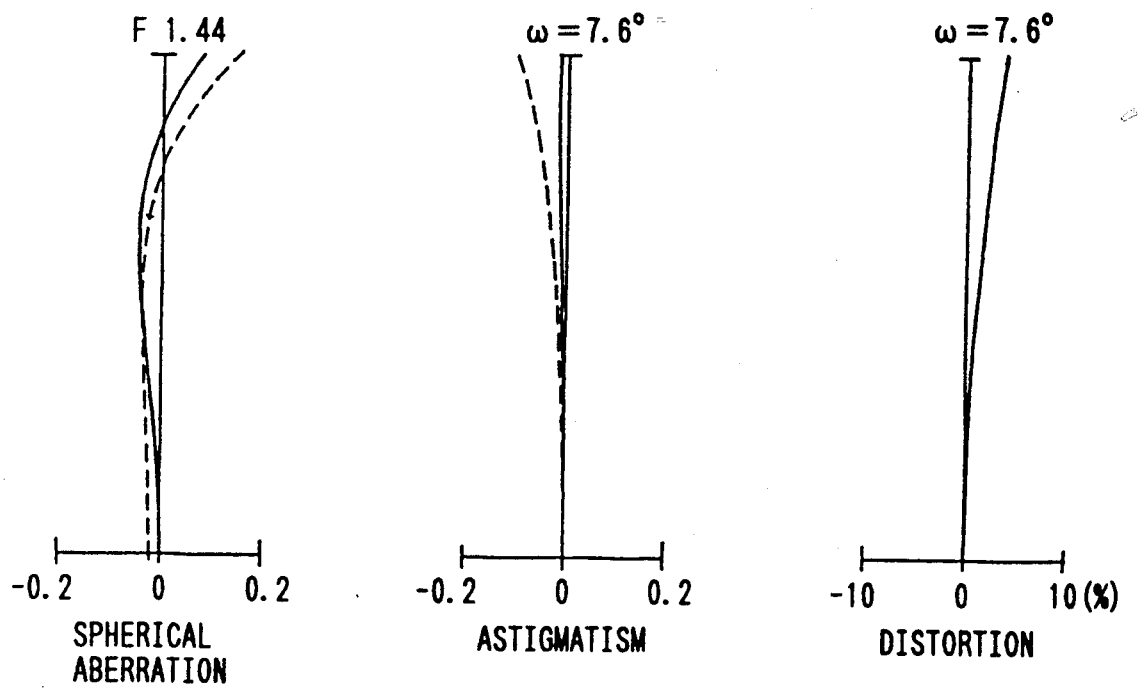
Figure 18C:
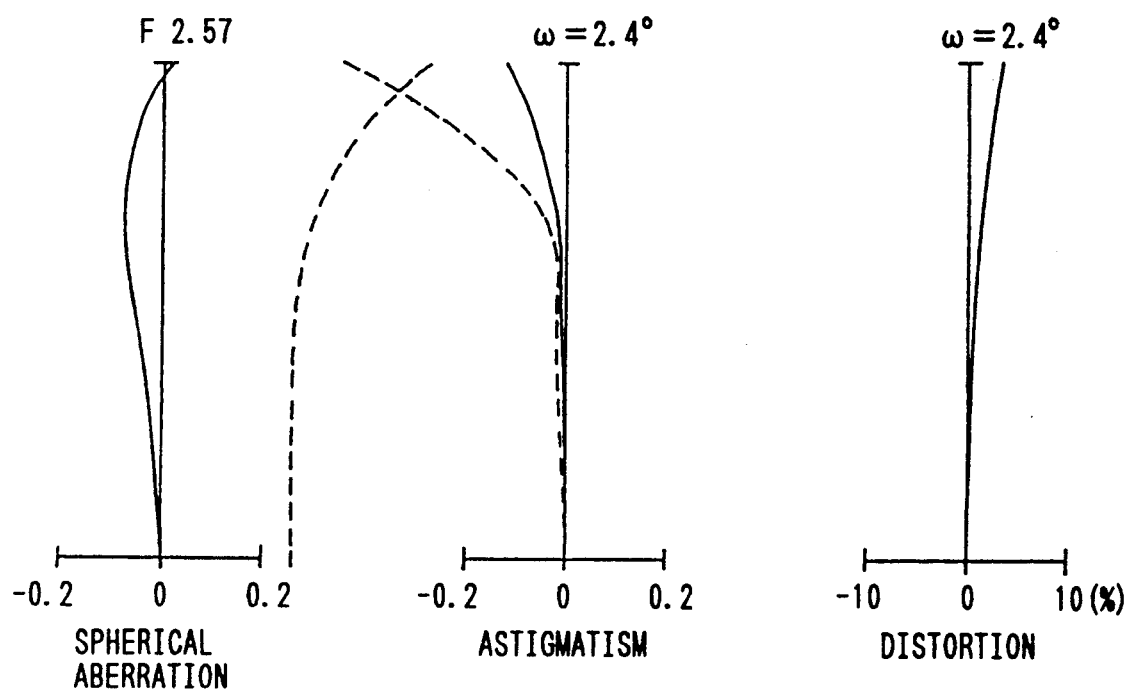

Examples of the zoom lens according to the present invention will be illustrated hereinafter. In Tables, the reference character R designates the radius of curvature of a surface, D the distance between surfaces, N the refractive index, and $V_d$ the Abbe's number. Various values described in the specification in the Examples are given in a separate Table.

In Examples 1 and 2, the third lens group comprises a negative single lens. In Examples 3 to 6, it comprises a cemented lens including a negative lens and a positive lens for the purpose of correcting on-axis chromatic aberration at the intermediate focal length which is under as compared with the wide angle end and the telephoto-end.

In Example 6, a positive lens closest to the object of the front unit of the fifth lens group comprises a cemented lens including a positive lens and a negative lens. With this arrangement, it is possible to prevent on-axis chromatic aberration in the entire variable power range from being insufficient in correction.

Moreover, in Example 7, the fourth lens group consists of a positive single lens having a strong convex surface on the image side to reduce the number of lenses in the entire system.

In Examples 8 and 9, the variable power ratio of about 12 and a large aperture with F number being about F1.4 is achieved.

| Example 1 | | | |
|---|---|---|---|
| Focal length: f = 11.34–86.31 | $f_1$ = 55.96 | $f_5$ = 37.59 | |
| Field angle 2ω = 54.6°–7.0° | $f_2$ = −14.11 | $f_{51}$ = 61.94 | |
| F number F = 1.25–1.94 | $f_3$ = −33.22 | $f_{52}$ = 50.04 | |
| Back focal length $f_B$ = 8.26 | $f_4$ = 29.70 | | |

| No. | | R | D | N | $V_d$ |
|---|---|---|---|---|---|
| 1 | ⎤ | 132.272 | 1.60 | 1.84666 | 23.8 |
| 2 | | 48.294 | 8.50 | 1.69680 | 55.5 |
| 3 | 1st lens group | −241.338 | 0.20 | | |
| 4 | | 40.997 | 5.20 | 1.71300 | 53.9 |
| 5 | ⎦ | 123.046 | a | | |
| 6 | | 75.702 | 0.90 | 1.77250 | 49.6 |
| 7 | | 14.803 | 5.50 | | |

-continued

Example 1

| | | | | | |
|---|---|---|---|---|---|
| 8 | 2nd lens group | −20.006 | 0.80 | 1.69680 | 55.5 |
| 9 | | 20.006 | 3.10 | 1.84666 | 23.8 |
| 10 | | −293.424 | b | | |
| 11 | 3rd lens group | −20.563 | 1.00 | 1.69680 | 55.5 |
| 12 | | −187.854 | c | | |
| 13 | | −127.624 | 3.20 | 1.60311 | 60.7 |
| 14 | | −33.771 | 0.20 | | |
| 15 | 4th lens group | 459.074 | 5.70 | 1.60311 | 60.7 |
| 16 | | −30.235 | 3.70 | | |
| 17 | | 49.673 | 5.30 | 1.71300 | 53.9 |
| 18 | | −74.095 | 2.00 | | |
| 19 | | −35.050 | 1.20 | 1.84666 | 23.8 |
| 20 | | −352.500 | 0.20 | | |
| 21 | | 26.427 | 4.10 | 1.51633 | 64.1 |
| 22 | 5th lens group | 81.849 | 13.93 | | |
| 23 | | 57.744 | 3.00 | 1.48749 | 70.2 |
| 24 | | −70.704 | 0.20 | | |
| 25 | | 24.596 | 1.00 | 1.83400 | 37.2 |
| 26 | | 11.598 | 2.57 | | |
| 27 | | 13.649 | 5.80 | 1.51633 | 64.1 |
| 28 | | −233.203 | 5.00 | | |
| 29 | Cover glass | ∞ | 5.10 | 1.51633 | 64.1 |
| 30 | | ∞ | | | |

Variable space

| f | a | b | c |
|---|---|---|---|
| 11.34 | 1.1800 | 30.0237 | 3.6964 |
| 31.28 | 20.2392 | 8.7747 | 5.8862 |
| 86.31 | 30.9600 | 3.0437 | 0.8964 |

Diaphragm position 1.7 behind the 16th surface
Exit pupil position −98.4 from an image surface
Total length Σd + $f_B$ = 132.18

Example 2

Focal length f = 11.32−86.34   $f_1$ = 58.46   $f_5$ = 38.40
Field angle 2ω = 54.8°−7.0°   $f_2$ = −14.57   $f_{51}$ = 83.96
F number F = 1.25−2.00   $f_3$ = −37.10   $f_{52}$ = 43.49
Back focal length $f_B$ = 8.26   $f_4$ = 29.21

| No. | | R | D | N | $V_d$ |
|---|---|---|---|---|---|
| 1 | | 172.878 | 1.60 | 1.84666 | 23.8 |
| 2 | | 49.172 | 8.50 | 1.71300 | 53.9 |
| 3 | 1st lens group | −173.378 | 0.20 | | |
| 4 | | 40.620 | 4.70 | 1.71300 | 53.9 |
| 5 | | 102.394 | a | | |
| 6 | | 44.496 | 0.80 | 1.77250 | 49.6 |
| 7 | | 14.363 | 5.40 | | |
| 8 | 2nd lens group | −18.790 | 0.70 | 1.69680 | 55.5 |
| 9 | | 18.790 | 3.10 | 1.84666 | 23.8 |
| 10 | | −689.451 | b | | |
| 11 | 3rd lens group | −21.266 | 1.00 | 1.69680 | 55.5 |
| 12 | | −121.802 | c | | |
| 13 | | −100.000 | 2.70 | 1.62299 | 58.2 |
| 14 | 4th lens group | −36.645 | 0.20 | | |
| 15 | | 319.107 | 6.20 | 1.62299 | 58.2 |
| 16 | | −28.021 | 2.90 | | |
| 17 | | 44.722 | 5.40 | 1.71300 | 53.9 |
| 18 | | −88.279 | 2.20 | | |
| 19 | | −31.944 | 1.20 | 1.84666 | 23.8 |
| 20 | | −312.122 | 0.20 | | |
| 21 | | 26.234 | 3.70 | 1.58913 | 61.2 |
| 22 | 5th lens group | 47.437 | 13.44 | | |
| 23 | | 51.066 | 3.80 | 1.48749 | 70.2 |
| 24 | | −51.066 | 0.20 | | |
| 25 | | 27.119 | 1.00 | 1.83400 | 37.2 |
| 26 | | 11.799 | 2.16 | | |
| 27 | | 13.857 | 6.20 | 1.51644 | 64.1 |
| 28 | | −107.018 | 5.00 | | |
| 29 | Cover glass | ∞ | 5.10 | 1.51644 | 64.1 |
| 30 | | ∞ | | | |

Variable space

| f | a | b | c |
|---|---|---|---|
| 11.32 | 0.8000 | 31.9801 | 3.3199 |
| 31.45 | 21.1648 | 8.7658 | 6.1694 |
| 86.34 | 32.6200 | 2.5964 | 0.8836 |

Diaphragm position 1.3 behind the 16th surface
Exit pupil position −105.6 from an image surface
Total length Σd + $f_B$ + 131.96

Example 3

Focal length f = 11.33−86.37   $f_1$ = 58.51   $f_5$ = 39.07
Field angle 2ω = 54.8°−7.0°   $f_2$ = −14.61   $f_{51}$ = 84.54
F number F = 1.25−2.01   $f_3$ = −36.62   $f_{52}$ = 43.59
Back focal length $f_B$ = 8.26   $f_4$ = 29.01

| No. | | R | D | N | $V_d$ |
|---|---|---|---|---|---|
| 1 | | 165.674 | 1.50 | 1.84666 | 23.8 |
| 2 | | 48.860 | 8.75 | 1.71300 | 53.9 |
| 3 | 1st lens group | −151.311 | 0.20 | | |
| 4 | | 38.828 | 4.35 | 1.71300 | 53.9 |
| 5 | | 82.199 | a | | |
| 6 | | 43.485 | 0.70 | 1.77q50 | 49.6 |
| 7 | | 14.546 | 5.40 | | |
| 8 | 2nd lens group | −18.923 | 0.65 | 1.69680 | 55.5 |
| 9 | | 18.923 | 3.00 | 1.84666 | 23.8 |
| 10 | | −2509.856 | b | | |
| 11 | | −22.894 | 0.75 | 1.77250 | 49.6 |
| 12 | 3rd lens group | 149.356 | 1.75 | 1.84666 | 23.8 |
| 13 | | −149.356 | c | | |
| 14 | | −150.000 | 3.00 | 1.58913 | 61.2 |
| 15 | | −38.988 | 0.20 | | |
| 16 | 4th lens group | 2553.390 | 5.55 | 1.69680 | 55.5 |
| 17 | | −29.439 | 2.90 | | |
| 18 | | 38.471 | 5.40 | 1.69680 | 55.5 |
| 19 | | −98.922 | 2.30 | | |
| 20 | | −33.126 | 1.00 | 1.84666 | 23.8 |
| 21 | | 311.144 | 0.20 | | |
| 22 | | 24.513 | 4.30 | 1.48749 | 70.2 |
| 23 | | 74.317 | 12.56 | | |
| 24 | 5th lens group | 54.705 | 3.50 | 1.48749 | 70.2 |
| 25 | | −54.705 | 0.20 | | |
| 26 | | 26.949 | 0.80 | 1.83400 | 37.2 |
| 27 | | 11.749 | 2.54 | | |
| 28 | | 14.263 | 6.40 | 1.51633 | 64.1 |
| 29 | | −74.465 | 5.00 | | |
| 30 | Cover glass | ∞ | 5.10 | 1.51633 | 64.1 |
| 31 | | ∞ | | | |

Variable space

| f | a | b | c |
|---|---|---|---|
| 11.33 | 0.8000 | 31.7996 | 3.1004 |
| 31.50 | 21.1648 | 8.5967 | 5.9385 |
| 86.37 | 32.6200 | 2.5075 | 0.5725 |

Diaphragm position 1.3 behind the 17th surface
Exit pupil position −113.6 from an image surface

Example 4

Focal length f = 11.33−86.36   $f_1$ = 55.51   $f_5$ = 39.16
Field angle 2ω = 54.6°−7.0°   $f_2$ = −14.14   $f_{51}$ = 68.08
F number F = 1.25−2.00   $f_3$ = −35.60   $f_{52}$ = 50.19
Back focal length $f_B$ = 8.26   $f_4$ = 29.38

| No. | | R | D | N | $V_d$ |
|---|---|---|---|---|---|
| 1 | 1st lens group | 162.536 | 1.60 | 1.84666 | 23.8 |
| 2 | | 47.894 | 8.60 | 1.71300 | 53.9 |
| 3 | | −147.707 | 0.20 | | |
| 4 | | 36.045 | 4.60 | 1.71300 | 53.9 |
| 5 | | 75.617 | a | | |
| 6 | 2nd lens group | 43.488 | 0.80 | 1.77250 | 49.6 |
| 7 | | 14.053 | 5.40 | | |
| 8 | | −18.570 | 0.70 | 1.71300 | 53.9 |
| 9 | | 18.570 | 3.10 | 1.84666 | 23.8 |
| 10 | | −386.793 | b | | |
| 11 | 3rd lens group | −31.073 | 0.80 | 1.69680 | 55.5 |
| 12 | | 365.760 | 1.60 | 1.69895 | 30.1 |

-continued

| | | | | | |
|---|---|---|---|---|---|
| 13 | | −147.180 | c | | |
| 14 | 4th lens group | −120.000 | 2.30 | 1.62299 | 58.2 |
| 15 | | −44.640 | 0.20 | | |
| 16 | | 179.207 | 7.00 | 1.62299 | 58.2 |
| 17 | | −27.370 | 2.90 | | |
| 18 | 5th lens group | 63.851 | 5.00 | 1.71300 | 53.9 |
| 19 | | −65.490 | 2.40 | | |
| 20 | | −27.949 | 1.20 | 1.84666 | 23.8 |
| 21 | | −101.616 | 0.20 | | |
| 22 | | 24.224 | 4.60 | 1.48749 | 70.2 |
| 23 | | 76.856 | 13.85 | | |
| 24 | | −531.485 | 3.00 | 1.50137 | 56.4 |
| 25 | | −41.375 | 0.20 | | |
| 26 | | 29.216 | 1.00 | 1.84666 | 23.8 |
| 27 | | 12.025 | 1.85 | | |
| 28 | | 14.338 | 6.20 | 1.51844 | 40.7 |
| 29 | | −83.659 | 5.00 | | |
| 30 | Cover glass | ∞ | 5.10 | 1.51633 | 64.1 |
| 31 | | ∞ | | | |

Variable space

| f | a | b | c |
|---|---|---|---|
| 11.33 | 0.8000 | 29.6804 | 3.8195 |
| 31.27 | 19.7869 | 8.2612 | 6.2519 |
| 86.36 | 30.4670 | 3.3609 | 0.4721 |

Diaphragm position 1.3 behind 17th surface
Exit pupil position −105.2 from an image surface
Total length Σd + $f_B$ = 131.96

Example 5

Focal length f = 11.33−86.40   $f_1$ = 58.46   $f_5$ = 39.00
Field angle 2ω = 54.8°–7.0°   $f_2$ = −14.66   $f_{51}$ = 91.02
F number F = 1.25−2.00   $f_3$ = −36.92   $f_{52}$ = 40.32
Back focal length $f_B$ = 8.26   $f_4$ = 28.92

| No. | | R | D | N | $V_d$ |
|---|---|---|---|---|---|
| 1 | 1st lens group | 168.122 | 1.50 | 1.84666 | 23.8 |
| 2 | | 49.045 | 8.75 | 1.71300 | 53.9 |
| 3 | | −152.545 | 0.20 | | |
| 4 | | 38.677 | 4.35 | 1.71300 | 53.9 |
| 5 | | 82.620 | a | | |
| 6 | 2nd lens group | 43.789 | 0.70 | 1.77250 | 49.6 |
| 7 | | 14.511 | 5.40 | | |
| 8 | | −18.950 | 0.65 | 1.69680 | 55.5 |
| 9 | | 18.950 | 3.00 | 1.84666 | 23.8 |
| 10 | | −1221.811 | b | | |
| 11 | 3rd lens group | −22.705 | 0.75 | 1.71300 | 53.9 |
| 12 | | 139.081 | 1.75 | 1.80518 | 25.4 |
| 13 | | −230.657 | c | | |
| 14 | 4th lens group | −150.000 | 3.35 | 1.58913 | 61.2 |
| 15 | | −35.448 | 0.20 | | |
| 16 | | −654.012 | 5.20 | 1.69680 | 55.5 |
| 17 | | −29.615 | 2.90 | | |
| 18 | 5th lens group | 33.834 | 5.80 | 1.69680 | 55.5 |
| 19 | | −95.149 | 2.00 | | |
| 20 | | −35.859 | 1.00 | 1.84666 | 23.8 |
| 21 | | −155.152 | 0.20 | | |
| 22 | | 22.564 | 3.70 | 1.48749 | 70.2 |
| 23 | | 40.653 | 13.04 | | |
| 24 | | 90.001 | 3.40 | 1.48749 | 70.2 |
| 25 | | −40.839 | 0.20 | | |
| 26 | | 33.522 | 0.80 | 1.80100 | 35.0 |
| 27 | | 12.155 | 2.66 | | |
| 28 | | 15.348 | 6.40 | 1.62299 | 58.2 |
| 29 | | −98.075 | 5.00 | | |
| 30 | Cover glass | ∞ | 5.10 | 1.51633 | 64.1 |
| 31 | | ∞ | | | |

Variable space

| f | a | b | c |
|---|---|---|---|
| 11.33 | 0.8000 | 31.6999 | 3.1996 |
| 31.49 | 21.1648 | 8.4961 | 6.0390 |
| 86.40 | 32.6200 | 2.5197 | 0.5603 |

Diaphragm position 1.3 behind the 17th surface
Exit pupil position −134.9 from an image surface
Total length Σd + $f_B$ = 131.96

Example 6

Focal length f = 11.32−86.46   $f_1$ = 38.55   $f_5$ = 38.55
Field angle 2ω = 54.8°–7.0°   $f_2$ = −14.45   $f_{51}$ = 69.14
F number = 1.25−2.01   $f_3$ = −38.23   $f_{52}$ = 46.68
Back focal length $f_B$ = 7.72   $f_4$ = 29.35

| No. | | R | D | N | $V_d$ |
|---|---|---|---|---|---|
| 1 | 1st lens group | 158.371 | 1.50 | 1.84666 | 23.8 |
| 2 | | 48.750 | 8.30 | 1.71300 | 53.9 |
| 3 | | −200.136 | 0.20 | | |
| 4 | | 41.497 | 4.70 | 1.71300 | 53.9 |
| 5 | | 111.745 | a | | |
| 6 | 2nd lens group | 49.466 | 0.70 | 1.77250 | 49.6 |
| 7 | | 14.825 | 5.50 | | |
| 8 | | −19.621 | 0.65 | 1.69680 | 55.5 |
| 9 | | 19.630 | 3.00 | 1.84666 | 23.8 |
| 10 | | 40027.230 | b | | |
| 11 | 3rd lens group | −24.197 | 0.75 | 1.69680 | 55.5 |
| 12 | | 84.040 | 1.80 | 1.84666 | 23.9 |
| 13 | | −1052.816 | c | | |
| 14 | 4th lens group | −998.172 | 2.80 | 1.62299 | 58.2 |
| 15 | | −54.206 | 0.20 | | |
| 16 | | 483.696 | 5.60 | 1.68680 | 55.5 |
| 17 | | −30.697 | 3.10 | | |
| 18 | 5th lens group | 38.513 | 6.90 | 1.65844 | 50.9 |
| 19 | | −38.500 | 1.00 | 1.80518 | 25.4 |
| 20 | | −88.465 | 2.10 | | |
| 21 | | −31.712 | 1.00 | 1.84666 | 23.8 |
| 22 | | −204.400 | 0.20 | | |
| 23 | | 22.205 | 4.00 | 1.58913 | 61.2 |
| 24 | | 43.580 | 10.95 | | |
| 25 | | 61.360 | 3.00 | 1.48749 | 70.2 |
| 26 | | −61.367 | 0.20 | | |
| 27 | | 34.317 | 0.80 | 1.83400 | 37.2 |
| 28 | | 11.677 | 2.45 | | |
| 29 | | 14.984 | 6.30 | 1.62299 | 58.2 |
| 30 | | −80.369 | 5.00 | | |
| 31 | Cover glass | ∞ | 5.90 | 1.51633 | 64.1 |
| 32 | | ∞ | | | |

Variable space

| f | a | b | c |
|---|---|---|---|
| 11.32 | 0.8000 | 32.2426 | 2.8574 |
| 31.42 | 21.1517 | 8.8655 | 5.8828 |
| 86.46 | 32.5996 | 2.7628 | 0.5376 |

Diaphragm position 1.4 behind 17th surface
Exit pupil position −101.8 from an image surface
Total length Σd + $f_B$ = 122.22

Example 7

Focal length f = 8.75−66.61   $f_1$ = 44.58   $f_5$ = 26.50
Field angle 2ω = 51.7°–6.6°   $f_2$ = −10.16   $f_{51}$ = 53.24
F number F = 1.25−2.05   $f_3$ = −38.39   $f_{52}$ = 28.68
Backfocal length $f_B$ = 5.42   $f_4$ = 25.49

| No. | | R | D | N | $V_d$ |
|---|---|---|---|---|---|
| 1 | | 71.227 | 1.40 | 1.80518 | 25.4 |
| 2 | | 32.930 | 7.50 | 1.51633 | 64.1 |
| 3 | 1st lens group | −144.362 | 0.20 | | |
| 4 | | 30.433 | 4.80 | 1.60311 | 60.7 |
| 5 | | 178.698 | a | | |
| 6 | | 38.078 | 0.70 | 1.77250 | 49.6 |
| 7 | | 11.706 | 3.85 | | |
| 8 | 2nd lens group | −13.895 | 0.65 | 1.71300 | 53.9 |
| 9 | | 13.895 | 2.30 | 1.84666 | 23.8 |
| 10 | | 224.970 | b | | |
| 11 | 3rd lens group | −23.302 | 0.70 | 1.69680 | 55.5 |
| 12 | | −183.085 | c | | |
| 13 | 4th lens group | 166.853 | 4.80 | 1.69680 | 55.5 |
| 14 | | −19.644 | 6.00 | | |

Example 7 (continued)

| | | R | D | N | Vd |
|---|---|---|---|---|---|
| 15 | | 30.518 | 4.00 | 1.71300 | 53.9 |
| 16 | | −59.257 | 1.60 | | |
| 17 | | −21.792 | 0.80 | 1.84666 | 23.8 |
| 18 | | −99.134 | 0.20 | | |
| 19 | | 19.453 | 2.50 | 1.51633 | 64.1 |
| 20 | 5th lens group | 34.393 | 12.50 | | |
| 21 | | 31.417 | 3.30 | 1.51633 | 64.1 |
| 22 | | −31.417 | 0.20 | | |
| 23 | | 21.608 | 0.70 | 1.83400 | 37.2 |
| 24 | | 8.300 | 1.20 | | |
| 25 | | 9.631 | 4.60 | 1.58913 | 61.2 |
| 26 | | −1139.758 | 2.32 | | |
| 27 | Cover glass | ∞ | 5.66 | 1.51633 | 64.1 |
| 31 | | ∞ | | | |

Variable space

| f | a | b | c |
|---|---|---|---|
| 8.75 | 0.9350 | 24.6750 | 1.4803 |
| 24.10 | 15.9408 | 5.8191 | 5.3304 |
| 66.61 | 24.3820 | 2.3036 | 0.4051 |

Diaphragm position 2.0 behind the 14th surface  
Exit pupil position −231.4 from an image surface  
Total length Σd + $f_B$ = 104.99

Example 8

Focal length f = 8.30–94.13   $f_1$ = 53.84   $f_5$ = 34.08  
Field angle 2ω = 54.3°–4.7°   $f_2$ = −11.60   $f_{51}$ = 63.53  
F number F = 1.44–2.57   $f_3$ = −34.54   $f_{52}$ = 38.98  
Backfocal length $f_B$ = 6.62   $f_4$ = 26.57

| No. | | R | D | N | Vd |
|---|---|---|---|---|---|
| 1 | | 142.695 | 1.30 | 1.78472 | 25.7 |
| 2 | | 41.824 | 7.70 | 1.62299 | 58.2 |
| 3 | 1st lens group | −138.463 | 0.20 | | |
| 4 | | 38.863 | 4.10 | 1.69350 | 53.2 |
| 5 | | 125.572 | a | | |
| 6 | | 58.481 | 0.70 | 1.77250 | 49.6 |
| 7 | | 13.270 | 4.20 | | |
| 8 | 2nd lens group | −16.838 | 0.65 | 1.69680 | 55.5 |
| 9 | | 16.838 | 2.20 | 1.84666 | 23.8 |
| 10 | | 328.952 | b | | |
| 11 | | −21.975 | 0.75 | 1.77250 | 49.6 |
| 12 | 3rd lens group | 154.386 | 1.45 | 1.84666 | 23.8 |
| 13 | | −154.386 | c | | |
| 14 | | −475.822 | 2.55 | 1.58913 | 61.2 |
| 15 | | −37.653 | 0.20 | | |
| 16 | 4th lens group | 280.933 | 4.30 | 1.58913 | 61.2 |
| 17 | | −26.643 | 4.40 | | |
| 18 | | 33.503 | 4.20 | 1.65844 | 50.9 |
| 19 | | −76.621 | 1.50 | | |
| 20 | | −30.745 | 0.80 | 1.84666 | 23.8 |
| 21 | | 1191.222 | 0.20 | | |
| 22 | | 21.148 | 3.10 | 1.48749 | 70.2 |
| 23 | 5th lens group | 57.193 | 13.96 | | |
| 24 | | 53.869 | 2.30 | 1.48749 | 70.2 |
| 25 | | −53.869 | 0.20 | | |
| 26 | | 23.992 | 0.70 | 1.83400 | 58.2 |
| 27 | | 9.871 | 2.68 | | |
| 28 | | 12.486 | 4.00 | 1.58913 | 61.2 |
| 29 | | −101.531 | 4.65 | | |
| 30 | Cover glass | ∞ | 5.10 | 1.51633 | 64.1 |
| 31 | | ∞ | | | |

Variable space

| f | a | b | c |
|---|---|---|---|
| 8.30 | 1.0000 | 33.2947 | 3.0053 |
| 29.11 | 23.2360 | 6.9882 | 7.0758 |
| 94.13 | 33.7000 | 2.9996 | 0.6004 |

Diaphragm position 1.6 behind 17th surface  
Exit pupil position −146.2 from an image surface.  
Total length Σd + $f_B$ = 122.00

Example 9

Focal length f = 8.3–94.08   $f_1$ = 53.55   $f_5$ = 33.66  
Field angle 2ω = 54.3°–4.7°   $f_2$ = −11.41   $f_{51}$ = 60.81  
F number F = 1.44–2.57   $f_3$ = −36.67   $f_{52}$ = 37.85  
Backfocal length $f_B$ = 6.62   $f_4$ = 27.09

| No. | | R | D | N | Vd |
|---|---|---|---|---|---|
| 1 | | 138.570 | 1.30 | 1.80518 | 25.4 |
| 2 | | 41.517 | 8.00 | 1.62299 | 58.2 |
| 3 | 1st lens group | −131.769 | 0.20 | | |
| 4 | | 37.273 | 4.40 | 1.65844 | 50.9 |
| 5 | | 124.650 | a | | |
| 6 | | 56.351 | 0.70 | 1.77250 | 49.6 |
| 7 | | 13.185 | 4.20 | | |
| 8 | 2nd lens group | −16.461 | 0.65 | 1.69680 | 55.5 |
| 9 | | 16.461 | 2.20 | 1.84666 | 23.8 |
| 10 | | 269.363 | b | | |
| 11 | | −23.237 | 0.75 | 1.77250 | 49.6 |
| 12 | 3rd lens group | 160.010 | 1.45 | 1.84666 | 23.8 |
| 13 | | −160.010 | c | | |
| 14 | | −769.025 | 2.55 | 1.58913 | 61.2 |
| 15 | | −36.663 | 0.20 | | |
| 16 | 4th lens group | 347.762 | 4.30 | 1.58913 | 61.2 |
| 17 | | −28.187 | 5.00 | | |
| 18 | | 34.057 | 4.20 | 1.65844 | 50.9 |
| 19 | | −69.952 | 1.50 | | |
| 20 | | −31.209 | 0.80 | 1.84666 | 23.8 |
| 21 | | 501.526 | 0.20 | | |
| 22 | | 20.878 | 3.10 | 1.48749 | 70.2 |
| 23 | 5th lens group | 61.252 | 13.65 | | |
| 24 | | 57.783 | 2.30 | 1.48749 | 70.2 |
| 25 | | −57.783 | 0.20 | | |
| 26 | | 23.755 | 0.70 | 1.83400 | 58.2 |
| 27 | | 9.886 | 3.11 | | |
| 28 | | 12.874 | 4.00 | 1.58913 | 61.2 |
| 29 | | −73.984 | 4.32 | | |
| 30 | Cover glass | ∞ | 5.10 | 1.51633 | 64.1 |
| 31 | | ∞ | | | |

Variable space

| f | a | b | c |
|---|---|---|---|
| 8.30 | 1.0000 | 33.3014 | 2.9986 |
| 28.98 | 22.9640 | 6.8767 | 7.4593 |
| 94.08 | 33.3000 | 3.4002 | 0.5998 |

Diaphragm position 1.6 behind the 17th surface  
Exit pupil position −201.5 from an image surface  
Total length Σd + $f_B$ = 123.00

According to the present invention, there can be obtained an excellent compact zoom lens, which is shorter in total length of lens and smaller in diameter of lens than conventional lenses despite the fact that the lens has a high variable power ratio of 8 to 12 and bright F number of about 1.2 to 1.4, and in addition, correction of aberrations well balanced over the entire variable power range is accomplished, as may be seen from the above-described Examples and aberration curves thereof.

Separate Table

| | EX 1 | EX 2 | EX 3 | EX 4 | EX 5 | EX 6 | EX 7 | EX 8 | EX 9 |
|---|---|---|---|---|---|---|---|---|---|
| $\|R_{44}\|/\{f_4(N_{42} − 1)\}$ | 1.69 | 1.54 | 1.46 | 1.50 | 1.47 | 1.50 | 1.11 | 1.70 | 1.77 |
| $f_5/f_w$ | 3.31 | 3.39 | 3.45 | 3.46 | 3.44 | 3.41 | 3.02 | 4.11 | 4.06 |

-continued

Separate Table

| | EX 1 | EX 2 | EX 3 | EX 4 | EX 5 | EX 6 | EX 7 | EX 8 | EX 9 |
|---|---|---|---|---|---|---|---|---|---|
| $f_{51}/f_5$ | 1.65 | 2.19 | 2.16 | 1.74 | 2.33 | 1.79 | 2.01 | 1.86 | 1.81 |
| $AN_{52p}$ | 1.50191 | 1.50191 | 1.50191 | 1.54141 | 1.55524 | 1.55524 | 1.55273 | 1.53831 | 1.53831 |
| $R_5/f_5$ | 0.309 | 0.307 | 0.301 | 0.307 | 0.312 | 0.303 | 0.313 | 0.290 | 0.294 |
| $|f_2|F_w/\{f_w Z\}$ | 0.204 | 0.211 | 0.211 | 0.205 | 0.212 | 0.209 | 0.191 | 0.177 | 0.175 |
| $f_3/f_2$ | 2.35 | 2.55 | 2.51 | 2.52 | 2.52 | 2.65 | 3.78 | 2.98 | 3.21 |
| $AN_{2N}$ | 1.73465 | 1.73465 | 1.73465 | 1.74275 | 1.73465 | 1.73465 | 1.74275 | 1.73465 | 1.73465 |
| $AV_{2N}-V_{2p}$ | 28.75 | 28.75q | 28.75 | 27.95 | 28.75 | 28.75 | 27.95 | 28.75 | 28.75 |

What is claimed is:

1. A zoom lens comprising, in order from an object side, a first lens groups having a positive refracting power, a second lens group having a negative refracting power, said second lens group being movable to vary power, a third lens group having a negative refracting power, said third lens group being movable to compensate for deviation of an image position caused by varying the power, a fourth lens group having a positive refracting power for making a divergent luminous flux which exits from the third lens group substantially afocal, and a fifth lens group having a positive refracting power to form an image, said fourth lens group including at least one positive single lens having a strong convex surface on the image side, said fifth lens group arranged behind a diaphragm between said fourth and fifth lens groups and said fifth lens group comprising, in order from an object side, a front unit having a positive refracting power and a rear unit having a refracting power arranged in an air spaced relation with said front unit, said front unit comprising, in order from said object side, a biconvex lens, a negative single lens with a surface having a strong curvature directed toward said object side and a positive meniscus single lens with a convex surface directed toward said object side, said rear unit comprising, in order from said object side, a positive single lens, a negative meniscus single lens with a concave surface directed toward the image and a positive single lens with a convex surface having a strong curvature directed toward said object side, said fifth lens group fulfilling the following conditions:

$$2.5 < f_5/f_w < 4.5$$

$$1.5 < f_{51}/f_5 < 2.5$$

$$AN_{52p} < 1.6$$

$$0.25 < R_5/f_5 < 0.35$$

wherein
 $f_w$: Focal length at the wide angle end of the entire system
 $f_5$: Synthesized focal length of the fifth lens group
 $f_{51}$: Synthesized focal length of the front unit in the fifth lens group
 $AN_{52p}$: Average value of the refractive indices of the positive lenses in the rear unit of the fifth lens group and,
 $R_5$: Radius of curvature of the surface on the image side of the negative meniscus single lens in the rear unit of the fifth lens group.

2. A zoom lens according to claim 1, wherein said fourth lens group is fulfilled with the following condition:

$$1.0 < |R_{44}|/\{f_4(N_{42} - 1)\} < 2.0 \ (R_{44} < 0)$$

where
 $f_4$: Synthesized focal length of the fourth lens group
 $N_{42}$: Refractive index of the positive lens closest to the image of the fourth lens group
 $R_{44}$: Radius of curvature of the surface on the image side of the positive lens closest to the image plane in the fourth lens group.

3. A zoom lens comprising, in order from an object side, a first lens group having a positive refracting power, said first lens group comprising three lenses including, from said object side, a doublet comprising a negative meniscus lens having a concave surface directed toward an image side, a biconvex lens having a strong convex surface directed toward said object side and a positive meniscus single lens having a convex surface directed toward said object side:
 a second lens group having a negative refracting power and being movable to vary power, said second lens group comprising three lens including, in order from said object side, a negative meniscus single lens having a concave surface directed toward said image side, a doublet comprising a biconcave single lens and a positive single lens having a strong convex surface directed toward said object side;
 a third lens group having a negative refracting power and being movable to compensate for deviation of an image position caused by varying the power, said third lens group comprising a negative lens having strong concave surface directed toward said object side;
 a fourth lens group having a positive refracting power for making a divergent luminous flux which exits from the third lens group substantially afocal, and a fifth lens group having a positive refracting power to form an image, characterized in that said fourth lens group includes at least one positive single lens having a strong convex surface on the image side, said fifth lens group being arranged behind a diaphragm between said fourth and fifth lens groups, said fifth lens group comprising, in order from said object side, a front unit having a positive refracting power and a rear unit having a refracting power arrange din an air spaced relation with said front unit, said front unit comprising, in order from said object side, a biconvex lens, a negative single lens with a surface having a strong curvature directed toward said object side and a positive meniscus single lens with a convex surface directed toward said object side, said rear unit comprising, in order from said object side, a positive single lens, a negative meniscus single lens with a concave surface directed toward the image and a positive single lens with a convex surface having a strong curvature directed toward said object side, the following conditions being fulfilled:

$$0.15 < |f_2| F_w/(f_w Z) < 0.25$$

$$2.0 < f_3/f_2 < 4.0$$

$$1.7 < AN_{2N}$$

$$25 < AV_{2N} - V_{2p}$$

wherein $f_i$: Focal length of the ith lens group $AN_{2N}$: Average value of the refractive indices of the negative lenses in the second lens group $AV_{2N}$: Average value of the Abbe's number of the negative lenses in the second lens group $V_{2p}$: Abbe's number of the positive lens in the second lens group $Z$: Variable power ratio $F_w$: Open F number at the wide end of the entire zoom lens system.

4. The zoom lens of claim 3 wherein said negative lens of said third lens group comprises a single lens.

5. The zoom lens of claim 3 wherein said negative lens of sadi third lens group comprises a doublet comprising a biconvex single lens and a positive single lens having a strong convex surface directed toward said object side.

* * * * *